(12) United States Patent
Muthler et al.

(10) Patent No.: US 12,159,342 B2
(45) Date of Patent: Dec. 3, 2024

(54) RAY TRACING HARDWARE ACCELERATION FOR SUPPORTING MOTION BLUR AND MOVING/DEFORMING GEOMETRY

(71) Applicant: NVIDIA Corporation, Santa Clara, CA (US)

(72) Inventors: Gregory Muthler, Chapel Hill, NC (US); John Burgess, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/749,951

(22) Filed: May 20, 2022

(65) Prior Publication Data

US 2022/0292759 A1 Sep. 15, 2022

Related U.S. Application Data

(62) Division of application No. 16/901,847, filed on Jun. 15, 2020, now Pat. No. 11,373,358.

(51) Int. Cl.
*G06T 15/06* (2011.01)
*G06F 9/50* (2006.01)
(Continued)

(52) U.S. Cl.
CPC ............ *G06T 15/06* (2013.01); *G06F 9/5027* (2013.01); *G06T 3/4007* (2013.01); *G06T 9/00* (2013.01); *G06T 15/08* (2013.01); *G06T 17/10* (2013.01)

(58) Field of Classification Search
CPC .......... G06T 15/06; G06T 3/4007; G06T 9/00; G06T 15/08; G06T 17/10; G06T 15/005;
(Continued)

(56) References Cited

U.S. PATENT DOCUMENTS

| 9,569,559 B2 | 2/2017 | Karras |
| 11,373,358 B2 | 6/2022 | Muthler et al. |

(Continued)

FOREIGN PATENT DOCUMENTS

| CN | 104091361 A | 10/2014 |
| CN | 104112291 A | 10/2014 |

(Continued)

OTHER PUBLICATIONS

Foley, et al.; "Computer Graphics: Principles and Practice" @nd Edition, Addison-Wesley, 1995 & 3rd Addition Addison Wesley, 2014.
(Continued)

*Primary Examiner* — Maurice L. McDowell, Jr.
(74) *Attorney, Agent, or Firm* — Nixon & Vanderhye P.C.

(57) ABSTRACT

Ray tracing hardware accelerators supporting motion blur and moving/deforming geometry are disclosed. For example, dynamic objects in an acceleration data structure are encoded with temporal and spatial information. The hardware includes circuitry that test ray intersections against moving/deforming geometry by applying such temporal and spatial information. Such circuitry accelerates the visibility sampling of moving geometry, including rigid body motion and object deformation, and its associated moving bounding volumes to a performance similar to that of the visibility sampling of static geometry.

19 Claims, 27 Drawing Sheets

(51) Int. Cl.
*G06T 3/4007* (2024.01)
*G06T 9/00* (2006.01)
*G06T 15/08* (2011.01)
*G06T 17/10* (2006.01)

(58) Field of Classification Search
CPC ......... G06T 1/20; G06T 1/60; G06T 2200/28; G06F 9/5027
See application file for complete search history.

(56) References Cited

U.S. PATENT DOCUMENTS

| | | | |
|---|---|---|---|
| 2005/0179686 A1* | 8/2005 | Christensen | G06T 15/40 345/423 |
| 2009/0256845 A1* | 10/2009 | Sevastianov | G06T 15/06 345/426 |
| 2010/0053162 A1 | 3/2010 | Dammertz et al. | |
| 2011/0181606 A1 | 7/2011 | Sumner | |
| 2012/0293515 A1 | 11/2012 | Clarberg | |
| 2014/0320495 A1 | 10/2014 | Clarberg | |
| 2014/0365532 A1* | 12/2014 | Karras | G06F 16/2246 707/803 |
| 2015/0089156 A1 | 3/2015 | Clohset | |
| 2018/0286103 A1 | 10/2018 | Woop | |
| 2019/0318445 A1 | 10/2019 | Benthin | |
| 2020/0356790 A1 | 11/2020 | Jaipuria | |
| 2021/0049808 A1 | 2/2021 | Janus | |
| 2021/0287422 A1 | 9/2021 | Saleh | |

FOREIGN PATENT DOCUMENTS

| | | | | |
|---|---|---|---|---|
| CN | 109685880 A | | 4/2019 | |
| EP | 1510973 A2 | | 3/2005 | |
| GB | 2513699 A | * | 11/2014 | ............ G06T 15/06 |
| GB | 2541505 A | | 2/2017 | |

OTHER PUBLICATIONS

Arther Appel, "Some Techniques for Shading Machine Renderings of Solids" SJCC 1968, pp. 27-45.
Turner Whitted, "An Improved Illumination Model for Shaded Display" pp. 343-349, Communications of the ACM vol. 23 Issue 6 (Jun. 1980).
James Kajiya, "The Rendering Equation", Computer Graphics SIGGRAPH 1986 Proceedings, vol. 20, pp. 143-150.
Hery, et al.; "Towards Bidirectional Path Tracing at Pixar", 2016, pp. 1-20.
Parker, et al.; "OptiX: A General Purpose Ray Tracing Engine" ACM Transactions on Graphics, vol. 29, No. 4, Article 66, Jul. 2010.
Cook, et al.; "Distributed ray tracing," Proceedings of SIGGRAPH, pp. 165-174, 1984.
Lauterbach, et al,; "RTDEFORM: Interactive ray tracing of dynamic scenes using BVHs," Interactive Ray Tracing (IRT06) 2006.
Christenson, et al.; "Ray tracing for the movie 'Cars'," Interactive Ray Tracing IRT06, pp. 1-6, Sep. 2006.
Wald, et al.; "Ray Tracing Deformable Scenes using Dynamic Bounding Volume Hierarchies," ACM Transactions on Graphics, vol. 26, No. 1, 2007.
Hou, et al.; "Micropolygon ray tracing with defocus and motion blur," ACM SIGGRAPH, pp. 64:1-64:10, 2010.
Grunschloss, et al.; "MSBVH: An efficient acceleration data structure for ray traced motion blur," High Performance Graphics, HPG '11, 2011.
Shkurko, et al.; "Time Interval Ray Tracing for Motion Blur", IEEE Transactions on Visualization and Computer Graphics, vol. 24, Issue: 12, 2018.
https://raytracing-docs.nvidia.com/optix/guide/index.html#guide##; May 20, 2020, Version 1.8.
Schmid et al., "Programmable Motion Effects", 2010, 9 pages.
Navarro, et al.: "Motion blur rendering: State of the art." Comput. Graph. Forum, vol. 30, No. 1, 2011.
https://developer.nvidia.com/rtx/raytracing/vkray (Feb. 3, 2019).
Woop, "A Ray Tracing Hardware Architecture for Dynamic Scenes", Universitat des Saarlandes, 2004.
Chinese Office Action issued in Chinese Application No. 202110624860.2 dated Jun. 6, 2023.
Shkurko et al., "Time Interval Ray Tracing for Motion Blur", IEEE Transaction on Visualization and Computer Graphics, 14 pages, Dec. 31, 2017.
Chinese Office Action issued in Chinese Application No. 202110624860.2 mailed Sep. 6, 2023.
Yuan et al., "A sharping method of image blurred by fog", Journal of Xi'an University of Posts and Telecommunications, vol. 17, No. 6, China Academic Journal Electronic Publishing House, pp. 27-32, DOI:10.13682/j.issn.2095-6533.2012.06.019, Nov. 2012.
Zhao et al., "Racy Tracing Algorithm Based on GPU", Ordnance Industry Automation, China Academic Journal Electronic Publishing House, pp. 68-71, doi: 10.7690/bgzdh.2016.05.018, with English abstract, 2022.

* cited by examiner

FIG. 4
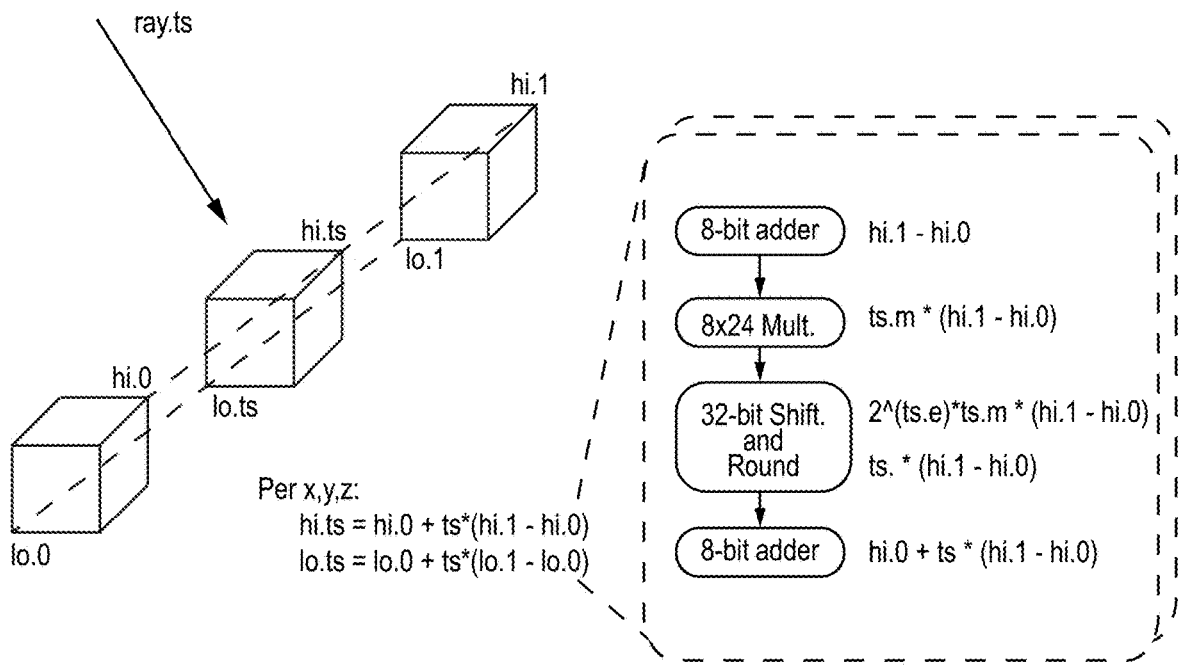
FIG. 4A
FIG. 5
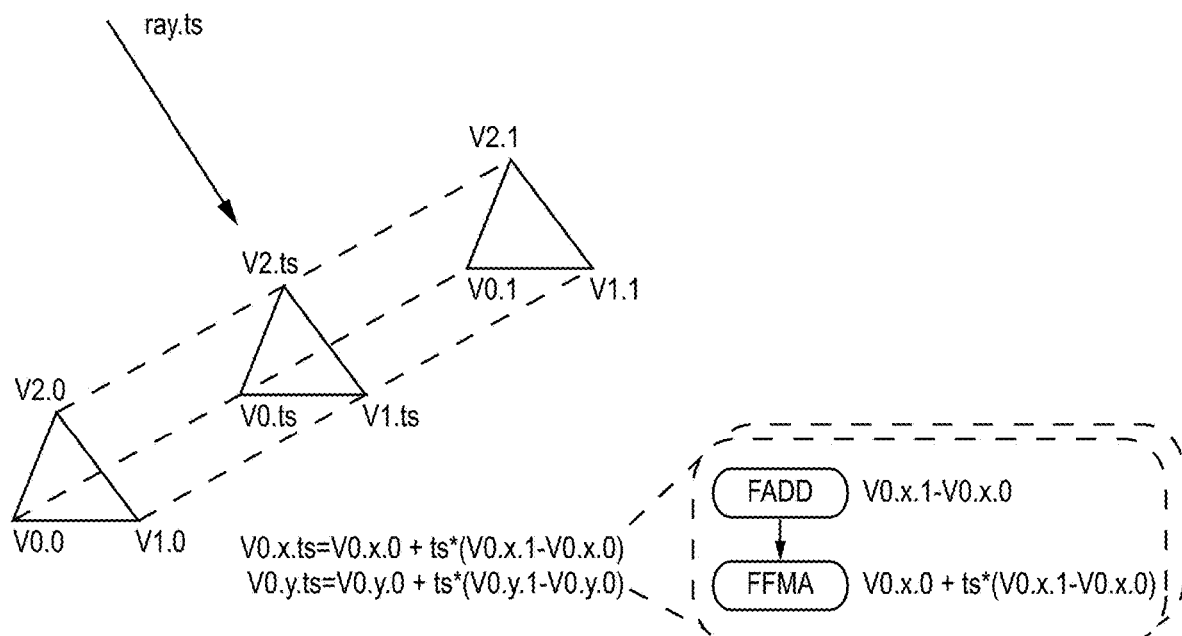
FIG 5A

Example Ray Tracing Shading Pipeline

FIG. 9  TRAVERSAL COPROCESSOR

TTU Processing

FIG. 12
Mode Field

| leafType | relPtr | lptr | format |
|---|---|---|---|

FIG. 13A
Complet

| mode | xscl | yscl | zscl | xmin | ymin | zmin | |
|---|---|---|---|---|---|---|---|
| itemBaseLo / leafPtrLo | | | | misc | parentOfs / parentPtrLo | childOfs / childPtrLo | header |
| child 0 | | | | | | child 1 | |
| child 2 | | | | | | child 3 | |
| child 4 | | | | | | child 5 | |
| child 6 | | | | | | child 7 | |
| child 8 | | | | | | child 9 | children |
| child 10 | | | | | | child 11 / longPtrData | |

FIG. 13B
Motion Complet

| mode | xscl | yscl | zscl | xmin | ymin | zmin | |
|---|---|---|---|---|---|---|---|
| itemBaseLo / leafPtrLo | | | | misc | parentOfs / parentPtrLo | childOfs / childPtrLo | header |
| motion child 0 | | | | | | | 1002(0) |
| motion child 2 | | | | | | | 1002(2) |
| motion child 4 | | | | | | | 1002(4) |
| motion child 6 | | | | | | | children |
| motion child 8 | | | | | | | 1002(6) |
| motion child 10 / motion longPtrData | | | | | | | 1002(8) |
| | | | | | | | 1002(10) | child field motion child field longptrdata field motion longptrdata field data field FIG. 17A
Motion Blur Triangle

| VertexBase.X | VertexBase.Y | VertexBase.Z | VertexPositions |
|---|---|---|---|
| ... | ... | ... | ... |
| ... | TriangleIDs | ... | ... |
| ... | ... | ... | ... |
| ... | VertexIDs | TriangleID.Base | C.T.Header |

1012

FIG. 17B
Motion Blur Triangle Header

| Mode | Shift | NumTris ("M") | Precision.ID | Precision.Z | Precision.Y | Precision.X |
|---|---|---|---|---|---|---|

Vertex Positions Array ( (N-1) * (P.X+P.Y+P.Z) bits)

| bits | P.Z | P.Y | P.X | P.Z | P.Y | P.X | P.Z | P.Y | P.X | →0 |
|---|---|---|---|---|---|---|---|---|---|---|
| (N-1).Z | (N-1).Y | (N-1).X | – | – | (N-4)*(P.X+P.Y+P.Z) | 2.Z | 2.Y | 2.X | 1.Z | 1.Y | 1.X |

Triangle IDs Array ( (M-1) * P.ID bits)

| bits | P.ID | P.ID | P.ID | P.ID | P.ID | →0 |
|---|---|---|---|---|---|---|
| 1.ID | 2.ID | 3.ID | – | – | (M-7)*P.ID | (M-3).ID | (M-2).ID | (M-1).ID |

Vertex IDs Array ( M * x bits)

| 0.a | 0.fnc | 0.v2.end | 0.v1.end | 0.v0.end | 0.v2.start | 0.v1.start | 0.v0.start | 1.a | 1.fnc | 1.v2.end | 1.v1.end | 1.v0.end | 1.v2.start | – |

Instance node

| userInstanceIDLo | userInstanceIDHi | ext | rootCompletPtr | mask | head |
|---|---|---|---|---|---|
| m00 | m01 | m02 | m03 | | |
| m10 | m11 | m12 | m13 | | |
| m20 | m21 | m22 | m23 | | |

1022

FIG. 18B head(er) field

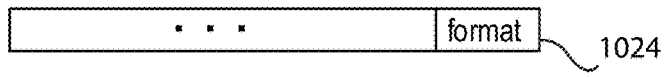

1024

FIG. 18C ext (ended header) field

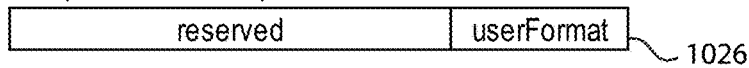

64B Static Instance Node:

| userInstanceIDLo | userInstanceIDHi | rootCompletPtr | mask | head |
|---|---|---|---|---|
| m00 | m01 | m02 | m03 | |
| m10 | m11 | m12 | m13 | |
| m20 | m21 | m22 | m23 | |

128B Motion Instance Node:

| userInstanceIDLo | userInstanceIDHi | ext | rootCompletPtr | mask | head |
|---|---|---|---|---|---|
| begin.inv.m00 | begin.inv.m01 | begin.inv.m02 | begin.inv.m03 | | |
| begin.inv.m10 | begin.inv.m11 | begin.inv.m12 | begin.inv.m13 | | |
| begin.inv.m20 | begin.inv.m21 | begin.inv.m22 | begin.inv.m23 | | |
| timeBegin | timeEnd | reserved | | | |
| end.inv.m00 | end.inv.m01 | end.inv.m02 | end.inv.m03 | | |
| end.inv.m10 | end.inv.m11 | end.inv.m12 | end.inv.m13 | | |
| end.inv.m20 | end.inv.m21 | end.inv.m22 | end.inv.m23 | | |

FIG. 19C

64B Static Instance Node + 128B Motion Extension:

| userInstanceIDLo | userInstanceIDHi | ext | rootCompletPtr | mask | head |
|---|---|---|---|---|---|
| m00 | m01 | m02 | | m03 | |
| m10 | m11 | m12 | | m13 | |
| m20 | m21 | m22 | | m23 | |
| timeBegin | timeEnd | reserved | | | |
| begin.inv.m00 | begin.inv.m01 | begin.inv.m02 | | begin.inv.m03 | |
| begin.inv.m10 | begin.inv.m11 | begin.inv.m12 | | begin.inv.m13 | |
| begin.inv.m20 | begin.inv.m21 | begin.inv.m22 | | begin.inv.m23 | |
| reserved | | | | | |
| end.inv.m00 | end.inv.m01 | end.inv.m02 | | end.inv.m03 | |
| end.inv.m10 | end.inv.m11 | end.inv.m12 | | end.inv.m13 | |
| end.inv.m20 | end.inv.m21 | end.inv.m22 | | end.inv.m23 | |

64B Static Instance Node + 64B Motion Range Change:

| userInstanceIDLo | userInstanceIDHi | ext | rootCompletPtr | mask | head |
|---|---|---|---|---|---|
| m00 | m01 | m02 | | m03 | |
| m10 | m11 | m12 | | m13 | |
| m20 | m21 | m22 | | m23 | |
| timeBegin | timeEnd | reserved | | | |
| reserved | | | | | |
| reserved | | | | | |
| reserved | | | | | |

64B Static Instance Node + Non-Interleaved 8B Motion Range Change:

| userInstanceIDLo | userInstanceIDHi | ext | rootCompletPtr | mask | head |
|---|---|---|---|---|---|
| m00 | m01 | m02 | | m03 | |
| m10 | m11 | m12 | | m13 | |
| m20 | m21 | m22 | | m23 | |

1038

| timeBegin | timeEnd |
|---|---|

| Field | Contents |
|---|---|
| RayFlags W | ... rayOp ... |
| | rayOpParamB ... |
| RayOrigin W | timestamp (motion blur) |
| | originX |
| | originY |
| | originZ |
| | tmin |
| RayDirection W | dirX |
| | dirY |
| | dirZ |
| | tmax |
| RayFlags2 W | ... rayOp ... |
| | rayOpParamS |
| RayOrigin2 W | timestamp (motion blur) |
| | originX2 |
| | originY2 |
| | originZ2 |
| RayDirection2 W | dirX2 |
| | dirY2 |
| | dirZ2 |

| Stack entry | | | |
|---|---|---|---|
| primitive range | first | | |
| | subsequent | | |
| complet | | | |
| instance node | first | TYPE ... | b |
| | subsequent | TYPE ... | b |

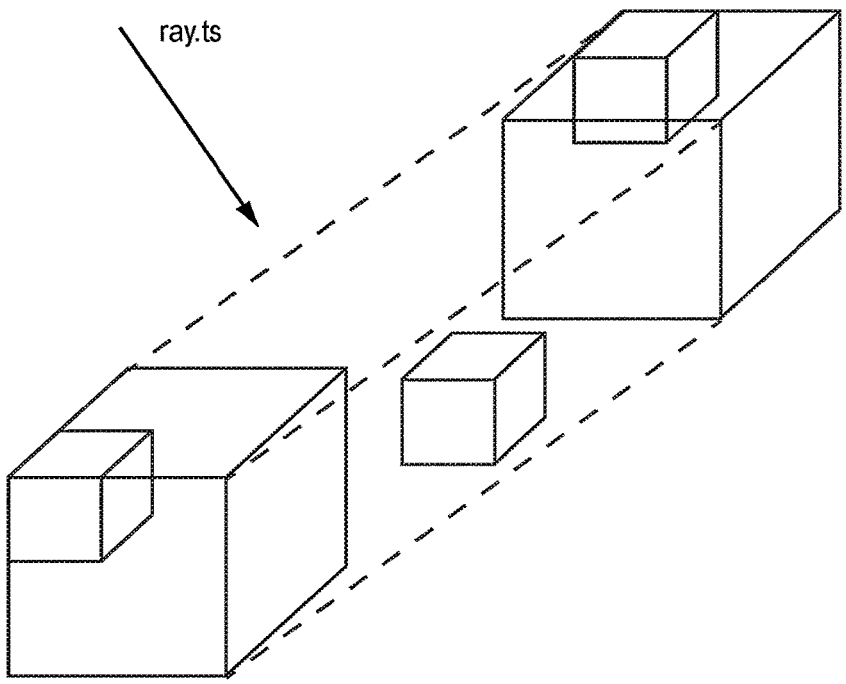

FIG. 24

```
// RCT Linear Interpolation
//   Inputs:
//       begin = 8 bit complet position at timestamp 0.0f
//       end = 8 bit complet position at timestamp 1.0f
//       timestamp = FP32 time stamp with a mantissa and exponent
//       isHiComponent = is the hi component of the AABB
//       isLoComponent = is the lo component of the AABB bool isForward = (end >= begin);
U32 difference = isForward ? (end - begin) : (begin - end);
U32 product = timestamp.mantissa * difference;
// Single shift includes: MSBs, Exponent of timestamp, and normalization
U32 shift = (32 - planePasBits) * (127 - timestamp.exponent) - 1;
U32 offset = (shift >= 32) ? 0 : (product >> shift);
U32 rem = (shift >= 32) ? product : ((product<<(32-shift))>>(32-shift));
U32 lerp = isForward ? (begin + offset) : (begin - offset);
if (rem != 0) {
        if (isHiComponent && isForward) {
           lerp += 1;
        } else if (isLoComponent && !isForward) {
           lerp -= 1;
        }
}
```

Example Process To Generate an Image

RAY TRACING HARDWARE ACCELERATION FOR SUPPORTING MOTION BLUR AND MOVING/DEFORMING GEOMETRY

CROSS-REFERENCE TO RELATED PATENTS AND APPLICATIONS

The present application is a divisional of U.S. application Ser. No. 16/901,847 filed Jun. 15, 2020, now U.S. Pat. No. 11,373,358, which is incorporated herein by reference in its entirety and for all purposes.

This application is related to the following commonly-assigned US patents and patent applications, the entire contents of each of which are incorporated by reference:

U.S. application Ser. No. 14/563,872 titled "Short Stack Traversal of Tree Data Structures" filed Dec. 8, 2014;

U.S. Pat. No. 9,582,607 titled "Block-Based Bounding Volume Hierarchy";

U.S. Pat. No. 9,552,664 titled "Relative Encoding for A Block-Based Bounding Volume Hierarchy";

U.S. Pat. No. 9,569,559 titled "Beam Tracing";

U.S. Pat. No. 10,025,879 titled "Tree Data Structures Based on a Plurality of Local Coordinate Systems";

U.S. application Ser. No. 14/737,343 titled "Block-Based Lossless Compression of Geometric Data" filed Jun. 11, 2015;

U.S. patent application Ser. No. 16/101,066 titled Method for Continued Bounding Volume Hierarchy Traversal on Intersection Without Shader Intervention, filed Aug. 10, 2018;

U.S. patent application Ser. No. 16/101,109 titled "Method for Efficient Grouping of Cache Requests for Datapath Scheduling", filed Aug. 10, 2018;

U.S. patent application Ser. No. 16/101,247 titled "A Robust, Efficient Multiprocessor-Coprocessor Interface", filed Aug. 10, 2018;

U.S. patent application Ser. No. 16/101,180 titled "Query-Specific Behavioral Modification of Tree Traversal", filed Aug. 10, 2018;

U.S. patent application Ser. No. 16/101,148 titled "Conservative Watertight Ray Triangle Intersection", filed Aug. 10, 2018;

U.S. patent application Ser. No. 16/101,196 titled "Method for Handling Out-of-Order Opaque and Alpha Ray/Primitive Intersections", filed Aug. 10, 2018; and U.S. patent application Ser. No. 16/101,232 titled "Method for Forward Progress and Programmable Timeouts of Tree Traversal Mechanisms in Hardware" filed Aug. 10, 2018;

U.S. patent application Ser. No. 16/897,764 titled "Hardware-Based Techniques Applicable for Ray Tracing for Efficiently Representing and Processing an Arbitrary Bounding Volume", filed Jun. 10, 2020;

U.S. patent application Ser. No. 16/901,023 titled "Hardware Acceleration for Ray Tracing Primitives that Share Vertices", filed Jun. 15, 2020.

FIELD

The present technology relates to computer graphics, and more particularly to ray tracers. More particularly, the technology relates to hardware circuitry for accelerating computer graphics processing including but not limited to ray tracing. The example non-limiting technology herein also relates to hardware able to accelerate intersection testing of geometry under motion, giving large performance speedups by keeping traversal internal to the hardware and reducing false positives that come from bloated static bounding volumes.

BACKGROUND & SUMMARY

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modeled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every 1/30th or 1/60th of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces)

using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic primitive to accurately simulate light transport in physically-based rendering algorithms such as path tracing, photon mapping, Metropolis light transport, and other light transport algorithms.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

Motion Blur in Computer Graphics Rendering

The OptiX API for Ray Tracing included support for a visualization effect known as "motion blur." Generally speaking, a ray generation program is responsible for defining pixels in the output image from the result of rays traced into the scene. It is sometimes useful to think of this as analogous to a camera. However, in the real world, capturing a photographic image is not instantaneous; instead, it is created by exposing an image plane (e.g., sensor or film) to light and integrating the incoming light over a finite time period while the camera's shutter is open. As photographers know, objects moving quickly relative to the shutter opening duration will appear as streaks in photographs, movies or videos. This streaking effect is called motion blur. See FIGS. 1A-1C for some examples.

If one uses computer graphics to render from a virtual camera in a virtual world, there is no requirement to simulate shutter times of an actual camera in the real world. For example, the developer of virtual sports simulations may choose to simulate a very high virtual frame rate to avoid motion blur. The viewer in such cases may want the crispest image available so they can act quickly based on what they see.

But to create "photorealistic" images—images that look like actual photographs, videos and movies—the virtual camera model should simulate the streaking of motion blur that would be present if captured by real, practical cameras in the real world. For example, when using computer graphics to render a movie, many people have expectations that the movie should look as if it had been shot with a real physical movie camera, even if everything on the screen is clearly virtual as opposed to physical. Viewers usually expect to see some motion smearing in each frame even when the image is created using a virtual camera because that's what a real camera would produce. Motion blur is also a visual cue that helps viewers perceive motion. In such high quality graphics contexts, nearly every pixel in the image frame may individually require some kind of motion blur in order to have the look the producer intends to create.

A number of techniques have been developed in the past for simulating motion blur. See for example: Cook et al, "Distributed ray tracing," Proceedings of SIGGRAPH, pp. 165-174 (1984); Lauterbach et al, "RTDEFORM: Interactive ray tracing of dynamic scenes using BVHs," Interactive Ray Tracing (IRT06) (2006); Christensen et al, "Ray tracing for the movie 'Cars'," Interactive Ray Tracing IRT06, pp. 1-6 (September 2006); Wald et al, "Ray Tracing Deformable Scenes using Dynamic Bounding Volume Hierarchies," ACM Transactions on Graphics, vol. 26, no. 1 (2007); Hou et al, "Micropolygon ray tracing with defocus and motion blur," ACM SIGGRAPH, pp. 64:1-64:10 (2010); Navarro et al, "Motion blur rendering: State of the art." Comput. Graph. Forum (vol. 30, no. 1, 2011); Grunschloss et al, "MSBVH: An efficient acceleration data structure for ray traced motion blur," High Performance Graphics, HPG '11 (2011); Shkurko et al, "Time Interval Ray Tracing for Motion Blur", IEEE Transactions on Visualization and Computer Graphics (2017). Some of these techniques rely on image post-processing, while others make use of ray tracing. Hardware-based ray tracing creates opportunities to efficiently simulate motion blur.

Distributed Ray Tracing for Simulating Motion Blur

Ray tracing offers a powerful way to simulate motion blur in computer graphics. One common technique often used for motion blur called "distributed ray tracing" has been used to distribute rays temporally as well as spatially. In particular, it is possible to simulate motion blur in a scene by modeling movement in the scene, shooting rays at different times and testing for intersection. Before each ray is cast, objects are translated or rotated to their correct position for that frame. The ray tracing results are then averaged. Objects with the most motion will have the most blurring in the rendered image. To avoid aliasing artifacts, instead of sampling a single value for each ray, multiple samples are taken and averaged together. Randomly distributed oversampling of rays through a scene reduces aliasing artifacts such as strobing. See e.g., Cook et al, cited above.

The prior OptiX API mentioned above provided ways to implement motion blur using such distributed ray tracing. First, the ray generation program was able to define a starting time and a duration for a simulated camera shutter, sampling at random times within the shutter duration. Second, the primitive intersection program could define animated primitives by storing multiple positions and interpolating between them, given a random sampling time. Beginning with OptiX version 5.0, programmers were able to specify motion data for Transform and Geometry nodes. OptiX automatically built acceleration data structures that respect this motion. There also was a function called "rtTrace" that was extended in OptiX version 5.0 to take an optional time argument for the ray. OptiX automatically evaluated transform and geometry motion at this specified time when traversing the scene. The time value was then available to user programs for intersection and shading. While OptiX does not allow for extrapolation, it has the concept of border modes on motion ranges which can be set individually for the beginning and the end to either vanish or clamp. See e.g., https://raytracing-docs.nvidia.com/optix/guide/index.html#motion_blur_math#motion-blur.

A brute force technique to accomplish motion blur using something like OptiX API is to procedurally sample N number of intersections per pixel, store all the values in an accumulation buffer, and then randomly select which samples to use for each pixel. While such an arrangement works fine in not-real-time rendering where the graphics processor has a very long time to process each frame, such processing must currently be done in software and is currently far too computationally labor intensive to be accommodated in anything close to real-time graphics systems.

Similarly, the OptiX™ programmable ray tracing pipeline including its motion blur capabilities provided significant advances but was still generally unable by itself to provide real time interactive response to user input on relatively inexpensive computing platforms for complex 3D scenes. NVIDIA meanwhile has been developing hardware acceleration capabilities for ray tracing. See e.g., U.S. Pat. Nos. 9,582,607; 9,569,559; US20160070820; US20160070767; and the other US patents and patent applications cited above. It has become highly desirable to use such hardware capabilities to accelerate motion blur, and past techniques have to some extent simulated certain kinds of motion blur in hardware such as motion blur due to camera movement. However, past high performance graphics hardware has generally not been able to significantly accelerate motion blur due to moving geometry as opposed to (or in addition to) camera movement. Instead, in many ray tracers, all traversal for motion blur visualization has tended to go through a software path and has therefore been much slower than it could be otherwise if it could be hardware accelerated.

Accordingly, further improvements are possible and desirable for accelerating visibility tests on moving/deforming geometry and to otherwise enhance the generation of motion blur effects in computer graphics systems.

BRIEF DESCRIPTION OF THE DRAWINGS

FIG. 4 shows an example interpolation of a bounding volume that moves during a time interval.

FIG. 4A shows example non-limiting bounding volume interpolation hardware.

FIG. 5 shows example interpolation of geometry that moves during a time interval.

FIG. 5A shows example geometry interpolation hardware.

FIG. 12 is a schematic illustration of an example mode field.

FIGS. 13A, 13B are schematic illustrations of example complet storage formats.

FIGS. 17A-17E are schematic illustrations of example motion blur primitive storage formats.

FIGS. 18A-18C are schematic illustrations of example instance node storage formats.

FIGS. 19A-19E are schematic illustrations of example static and motion instance node storage formats.

FIG. 21 is a schematic illustration of an example additional ray instruction storage format.

FIG. 22 is a schematic illustration of an example stack entry storage format.

FIG. 23 is a schematic illustration of an example bounding volume interpolation procedure with respect to a ray.

FIG. 24 shows example non-limiting interpolation pseudocode.

DETAILED DESCRIPTION OF NON-LIMITING EMBODIMENTS

It is relatively easy to hardware-accelerate motion blur in modern computer graphics systems when the geometry is static (does not move or deform) and only the location and/or direction of the (virtual) camera changes over the course of a frame, simulating a pan or other moving camera effect. For example, some distributed ray tracing processes can be accelerated with existing hardware such as NVIDIA's Turing architecture simply by changing the origin and direction of the rays appropriately over the course of each frame to simulate a moving camera. For example, it is possible to pick a time stamp for each ray, and then process as normal without any additional hardware support.

But in the real or virtual world, motion blur can come from any or all of three independent sources:

Moving camera,

Moving object (dynamic transform in computer graphics contexts)

Deforming object/geometry.

Figure 1B:
FIGS. 1A-1C show example non-limiting motion blur effects.
Figure 1A:
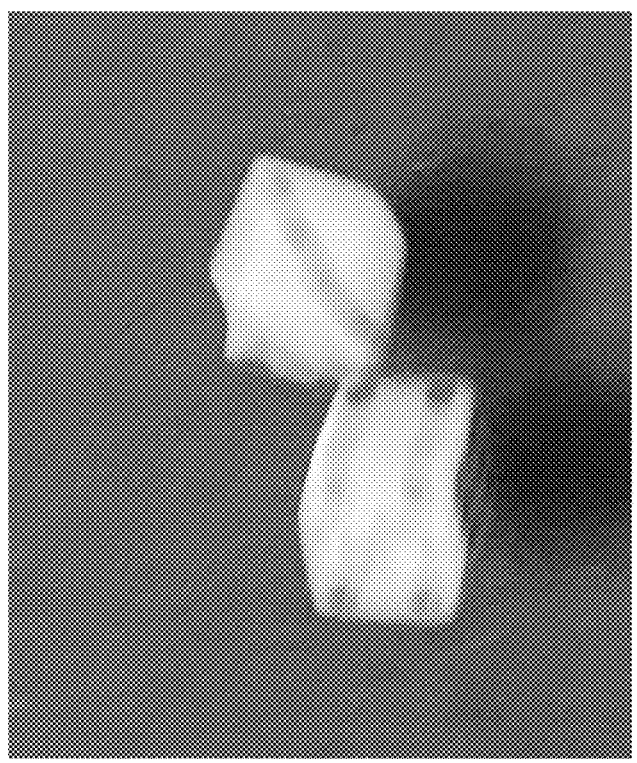

For example, with dynamic transform, an object with no internal movement (e.g., a teapot or other static object) is moved across the scene. As an example of dynamic transforms, consider rolling virtual dice on a virtual game table as shown in FIG. 1A. As the dice roll, the transforms of the object instances of the dice in virtual space are changing to relocate the vertices of the virtual objects in virtual space but the object vertices remain fixed relative to one another. Such motion can be captured using transforms based on timestamps. But to use a hardware accelerated traversal, the bounding volumes generally must be statically increased in size to include the full range of motion for the underlying geometry across all timestamps. This creates bounding boxes much larger than would otherwise be necessary—which leads to more false hits since a ray at any timestamp would hit the bounding box (not just the ray at the specific timestamp desired).

Deforming geometry adds further complexity, since the object has motion relative to itself and the vertices of the virtual geometry are changing their locations relative to one another. For example, consider an avatar (character) object moving an arm or leg while running, or a galloping horse as shown in FIG. 1B. In the case of the human runner or the galloping horse, the geometry is changing position (translating, rotating) in virtual space and is also changing position (translating, scaling, rotating) relative to itself. There are other scenarios in which an overall object is neither translating, rotating nor scaling but parts of the object are deforming relative to other parts (consider a stationary spring being compressed and decompressed, or human facial expressions).

In fact, it is exceedingly common in the real world for motion blur to reflect all three types of movement (moving camera, moving objects and deforming objects) all at the same time. You have seen this if you have ever watched a horse race on television or in a movie. FIG. 1B shows an example where a camera pans to follow a horse as it gallops down the track. As the camera pans (rotates or in some cases translates along a rail) to keep a close view of the galloping horse, the crowd or other objects in the background (e.g., sailors in uniform) behind the horse becomes blurred due to the relative motion of the camera and independent dynamic motion of those background objects. Meanwhile, even if the panning of the camera were perfect to eliminate relative motion between the camera and the horse and jockey, parts of the horse and jockey constantly deform as the horse extends and contracts its legs and the jockey bends down further over the horse. Accordingly, different parts of the horse and jockey are subject to different degrees and directions of motion blurring or streaking.

Figure 1C:
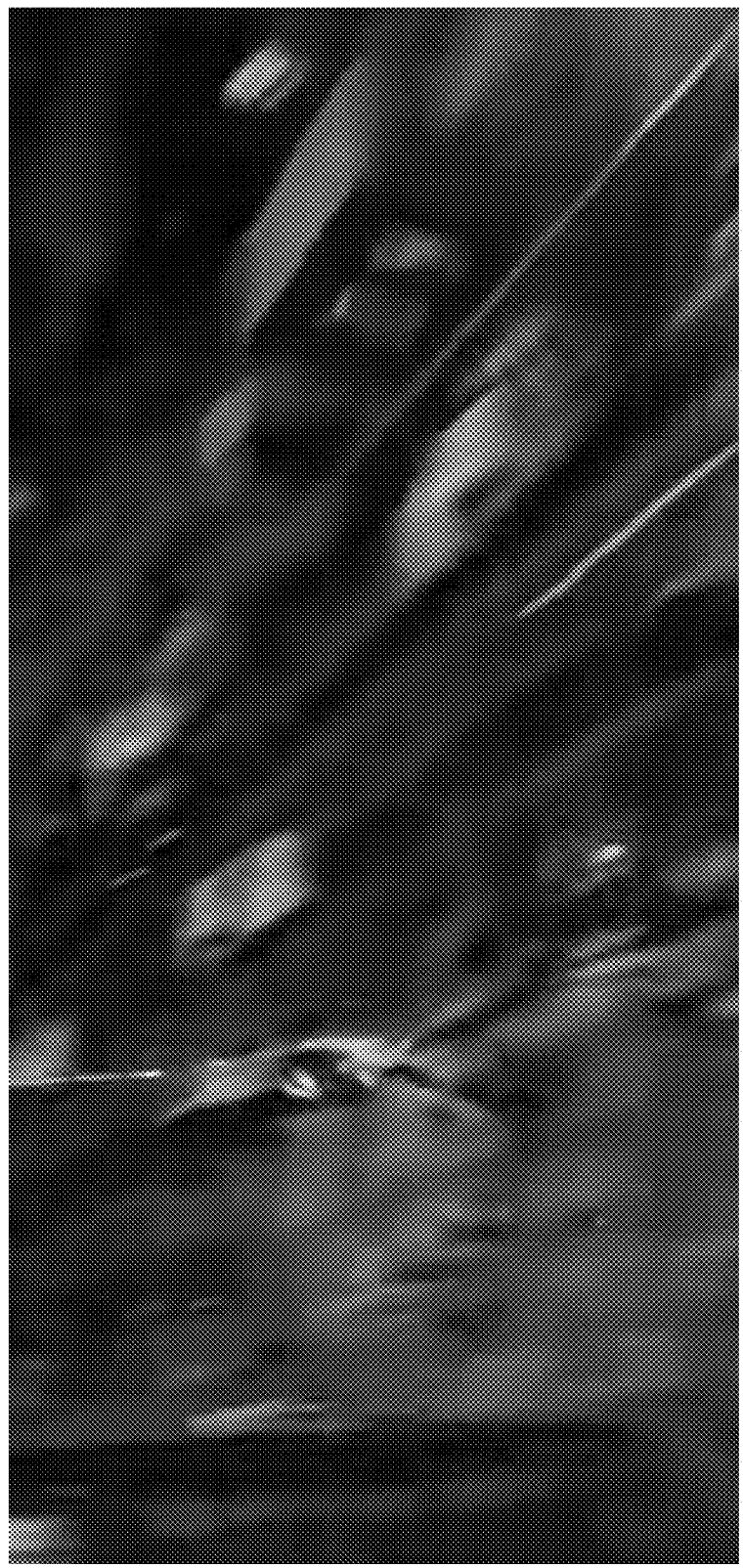

Such complex motion blur effects become even more important when virtual and real imagery are being combined, e.g., in a movie providing an animated avatar or other virtual objects within a conventionally-filmed real environment or in augmented and/or mixed reality in which virtual and real imagery are combined in a common view. As an example, FIG. 1C shows a city street photographed by a real movie camera with a virtual superhero avatar suspended over the street on a rope or filament. Camera movement and movement of the cars driving on the street cause all the real objects in the scene to appear as streaks. If the virtual avatar had no motion blur, the illusion of the virtual avatar as being part of the real scene would be unconvincing. Instead, it is desirable to match the simulated motion blur of the virtual avatar and other virtual objects (e.g., the rope or filament on which the virtual avatar is suspended) with the real motion blur the real movie camera detects to create the illusion that the virtual avatar and virtual objects were photographed by the real camera in the real scene. Similar considerations apply to real time augmented and/or mixed reality in which a viewer views a video camera captured image of the real world in googles, on a smart phone or on some other display, and a computer graphics system immersively superimposes or injects virtual objects into the real scene.

All three types of motion (camera, object dynamic transform, and object deformation) can be present when rendering any given pixel of such images. If one wishes to simulate motion blur not just from camera motion but also from object motion, conventional high performance hardware may not offer much in the way of acceleration and it instead may be necessary to fall back to software—with associated loss in performance.

Hardware Acceleration For Moving Geometry

The example non-limiting technology herein adds hardware support for accelerating motion blur applied to moving/deforming geometry and for using smaller bounding volumes for dynamic transforms.

In one embodiment, each dynamic object in an acceleration data structure is encoded with temporal and spatial information, and each ray is also encoded with temporal and spatial information. The hardware includes circuits that resolve (e.g., interpolate) the spatial information based on the temporal information. This technology adds the ability to accelerate intersection testing of geometry under motion, giving large performance speedups by keeping traversal internal to the hardware and reducing false positives that come from bloated static bounding volumes made large enough to contain moving geometry.

Example non-limiting embodiments thus hardware-accelerate processes that support motion blur visualization effects. In one embodiment, each ray is encoded with timing information specifying when the ray photon passes through the scene and each compressed treelet (complet) in an acceleration data structure representing moving geometry is encoded with spatial information specifying plural positions of the geometry at different times. The moving geometry can be any or all of translating, rotating, scaling up or down, and deforming (in the contexts herein, "moving geometry" refers to any or all of these). The hardware interpolates positions of the moving geometry at the timing of the ray to determine where the moving geometry exists in space at the instant of the ray photon, and compares the ray's spatial information with the interpolated positions of the moving geometry to determine whether the ray intersects the moving geometry at the timing of the ray.

In one embodiment, each motion complet is encoded with a beginning time and an end time at which the represented geometry exists in the scene. Additionally, each motion complet is further encoded with beginning and ending spatial positions of each vertex of the geometry the motion complet represents. In example non-limiting embodiments, the hardware interpolates between the beginning and ending spatial positions to calculate the spatial positions of the geometry at the timing or instant of the ray. The hardware tests the calculated interpolated spatial positions of the geometry against the position of the ray for the ray-primitive intersection test.

In one embodiment, the interpolation the hardware performs is a linear interpolation. In one embodiment, the hardware may perform other types of interpolation along a curve based on polynomials, Bezier curves, etc. In one embodiment, the hardware may transfer the interpolation task to a software-based processor if needed to provide additional flexibility for other interpolation types. Even when the hardware calls upon a software based processor to perform the interpolation calculations, the hardware may maintain procedural control over the intersection testing process and thus accelerate distributed ray tracing.

In one embodiment, the motion complets specify bounding volume beginning and ending spatial positions, and the hardware interpolates between the beginning and ending bounding volume spatial positions at the timing of the ray to perform a ray-bounding volume intersection test.

Further example non-limiting additions and improvements include:

Fast, low precision, conservative interpolation of geometry to a specific point in time, including bounding boxes, triangles (or any primitive), and instance transforms Parallel evaluation Stored end points of time interval Programmable decision to accelerate any portion in hardware or to return to a cooperating software-based processor (e.g., streaming multiprocessor) for a different algorithmic choice(s).

One way of looking at the present non-limiting techniques herein is that by treating pixels under motion differently from pixels not under motion, the techniques make the pixels under motion go just as fast as pixels not under motion. (In this context, "pixels under motion" are pixels whose color values depend on accurately ray tracing moving geometry during a simulated camera shutter time.) This functionality provides significant improvement over prior hardware implementations, which tended to treat all pixels (those under motion and those not under motion) the same. Unlike some prior approaches which had no hardware capable of interpolating the geometry, present non-limiting approaches are able to interpolate moving and/or deforming geometry in hardware without requiring intervention of a software-based processor to perform the interpolation.

Example non-limiting embodiments capture a range of motion within an acceleration data structure, thereby enabling a sampling across the interval of time represented by the acceleration data structure. In addition, hardware configured to receive ray-primitive intersection test requests is further configured to perform linear or other interpolation within the specified time interval of the geometry and/or bounding volume. Such interpolation benefits from encoding using timestamps to determine spatial correlation between rays and moving and/or deforming geometry. Hardware real-time ray tracing designs that include interpolators to interpolate between bounding volumes can leverage such hardware capabilities for motion blur effects, with the addition of interpolators that interpolate in hardware between geometry (e.g., vertex) positions.

In example non-limiting embodiments, each ray request is time-encoded to specify a point in time. If the time interval that a given acceleration data structure is capturing is parametrically between 0 and 1 (which can represent any desired time interval but in some embodiments could represent a frame time), a time value that is associated with the ray specifies when during that time period the photon represented by the ray is moving through the scene.

Use of the present technology is not limited to motion blur. Other examples use cases may be independent of motion blur effects. For example, the hardware capabilities disclosed herein may be useful in certain animation cases in which it is desirable to interpolate object motion across multiple frame times. As an example, suppose it would be desirable to show wind motion through a field of grass. The developer may not wish to undertake the complexity of providing a number of different BVH's representing the many blades of grass in all of the different positions blown by the wind. Instead, a developer could use the example non-limiting technology herein to dynamically interpolate between positions of grass blades across different frame times to provide animation effects. In other words, the example non-limiting hardware technology herein can be used for key frame animation without the need to rebuild the entire scene BVH for each different key frame. Such key frame animation could be used in conjunction with motion blur if desired.

The discussion below begins by explaining example acceleration data structures used to support motion blur. Next, example implementations that hardware-accelerate motion blur through hardware-based interpolation are described. An example tree traversal hardware architecture that provides hardware-based acceleration of motion blur related interpolation and visualization tests is then described.

Example Bounding Volume Hierarchy Supporting Motion Blur for Dynamic Objects

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

Figure 2A:
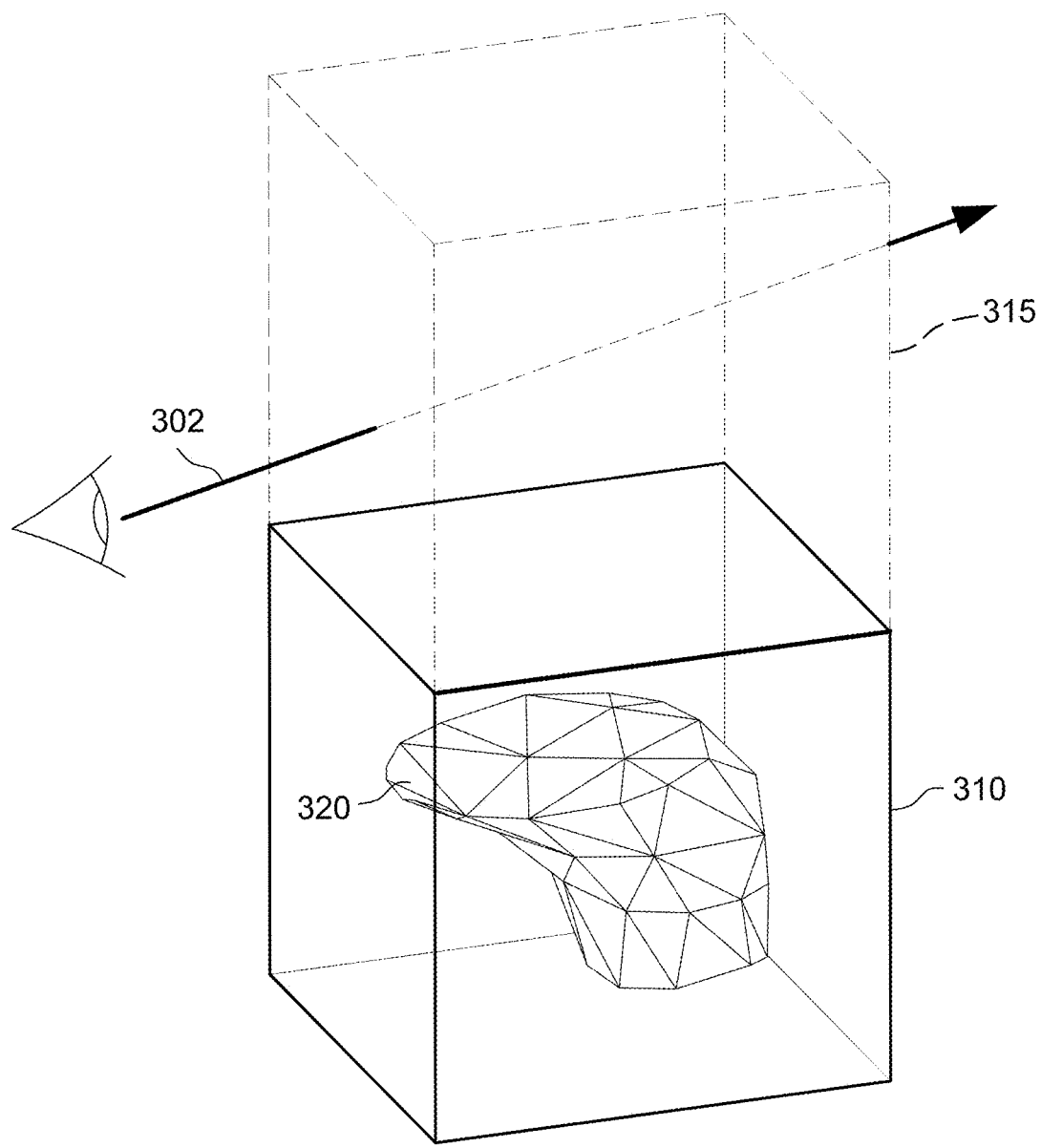
FIGS. 2A-2C show example simplified ray tracing tests to determine whether the ray passes through a bounding volume containing geometry and whether the ray intersects geometry within the bounding volume.
Figure 2B:
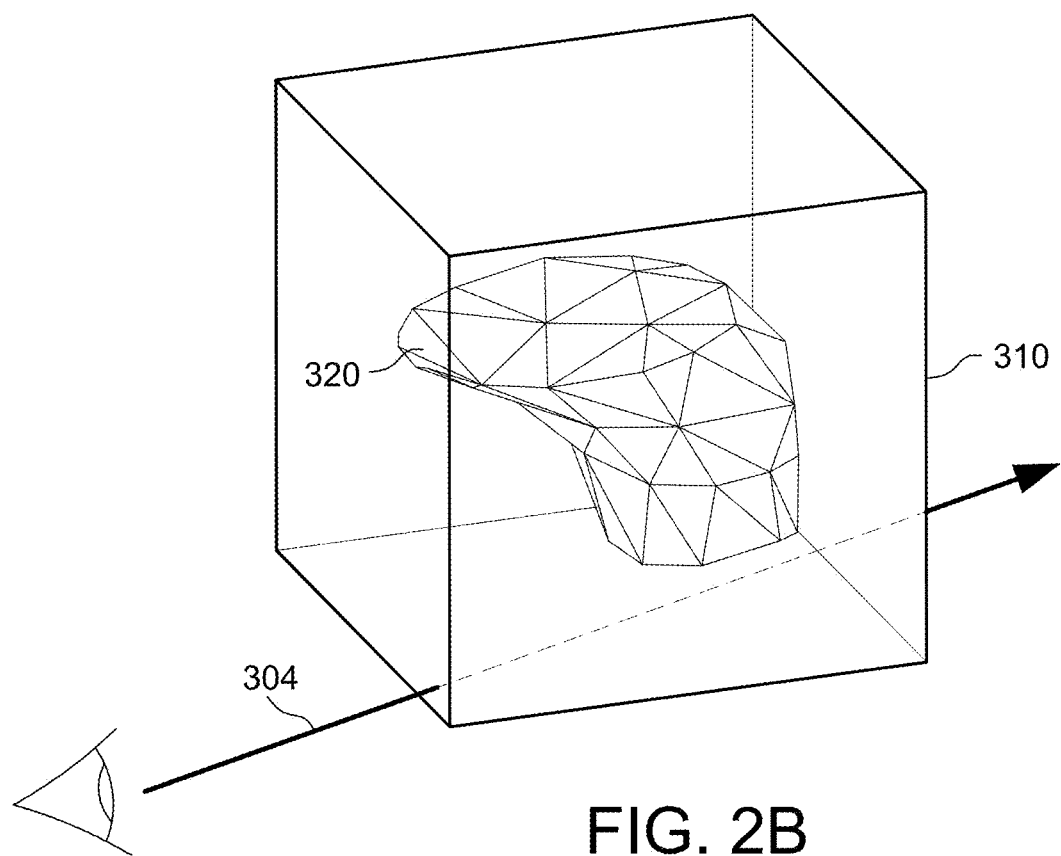
Figure 2C:
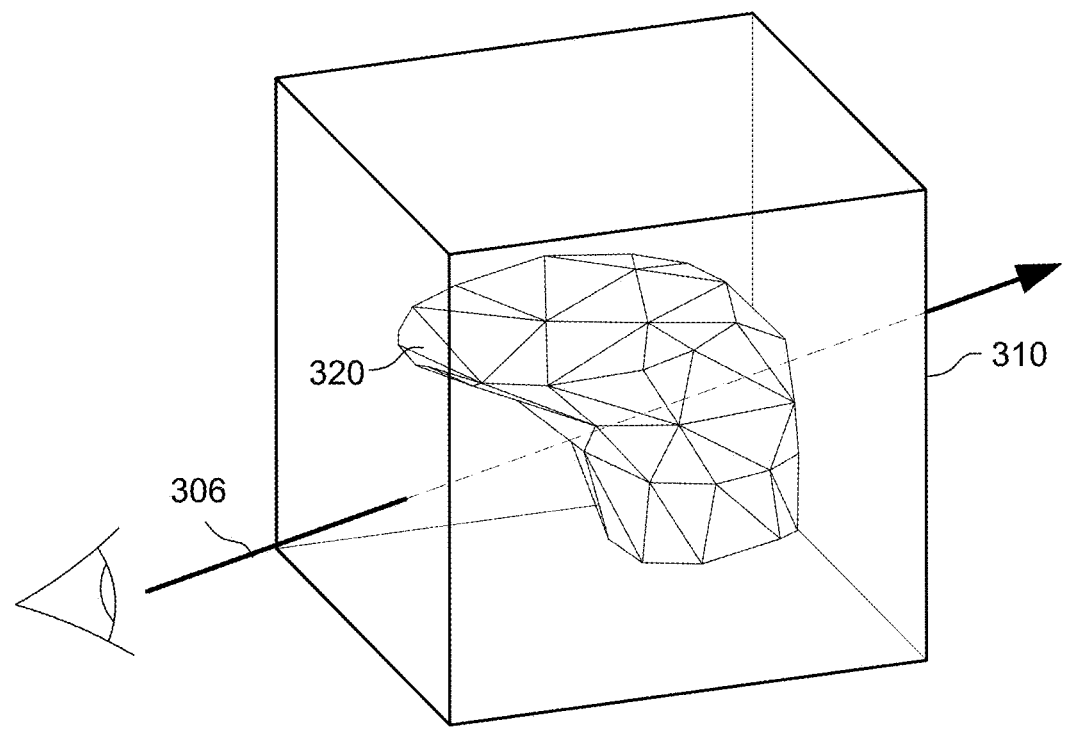

FIGS. 2A-2C illustrate ray tracing intersection testing in the context of a bounding volume 208 including geometric mesh 320. FIG. 2A shows a ray 302 in a virtual space including bounding volumes 310 and 315. To determine whether the ray 302 intersects geometry in the mesh 320, each geometric primitive (e.g., triangle) could be directly tested against the ray 302. But to accelerate the process (since the object could contain many thousands of geometric primitives), the ray 302 is first tested against the bounding volumes 310 and 315. If the ray 302 does not intersect a bounding volume, then it does not intersect any geometry inside of the bounding volume and all geometry inside the bounding volume can be ignored for purposes of that ray. Because in FIG. 2A the ray 302 misses bounding volume 310, any geometry of mesh 320 within that bounding volume need not be tested for intersection. While bounding volume 315 is intersected by the ray 302, bounding volume 315 does not contain any geometry and so no further testing is required.

On the other hand, if a ray such as ray 304 shown in FIG. 2B intersects a bounding volume 310 that contains geometry, then the ray may or may not intersect the geometry inside of the bounding volume so further tests need to be performed on the geometry itself to find possible intersections. Because the rays 304, 306 in FIGS. 2B and 2C intersect a bounding volume 310 that contains geometry, further tests need to be performed to determine whether any (and which) of the primitives inside of the bounding volume are intersected. In FIG. 2B, further testing of the intersections with the primitives would indicate that even though the ray 304 passes through the bounding volume 310, it does not intersect any of the geometry the bounding volume encloses (alternatively, as mentioned above, bounding volume 310 could be further volumetrically subdivided so that a bounding volume intersection test could be used to reveal that the ray does not intersect any geometry or more specifically which geometric primitives the ray may intersect).

FIG. 2C shows a situation in which the ray intersects bounding volume 310 and contains geometry that ray 306 intersects. To perform real time ray tracing, an intersection tester tests each geometric primitive within the intersected bounding volume 310 to determine whether the ray intersects that geometric primitive.

Example Bounding Volume Hierarchies

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In ray tracing, the time for finding the closest (or for shadows, any) intersection for a ray is typically order O(log n) for n objects when such an acceleration data structure is used. For example, AABB bounding volume hierarchies (BVHs) of the type commonly used for modern ray tracing acceleration data structures typically have an O(log n) search behavior.

The BVH acceleration data structure represents and/or references the 3D model of an object or a scene in a manner that will help assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

In many example implementations including NVIDIA RT Cores, the bounding volumes such as shown in FIG. 2A-2C use axis-aligned bounding boxes ("AABBs"), which can be compactly stored and easily tested for ray intersection. If a ray intersects against the bounding box of the geometry, then the underlying geometry is then tested as well. If a ray does not intersect against the bounding box of the geometry though, then that underlying geometry does not need to be tested. As FIGS. 2A-2C show, a hierarchy of AABB's is created to increase the culling effect of a single AABB bounding box test. This allows for efficient traversal and a quick reduction to the geometry of interest.

Building A Bounding Volume Hierarchy Including Dynamic Objects To Support Motion Blur Acceleration by Hardware As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic—with the dynamic part potentially contributing to motion blur effects. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may be implemented using highly-optimized software routines running on SMs 132 and/or CPU 120 and/or other development systems e.g., during development of an application.

Figure 3A:
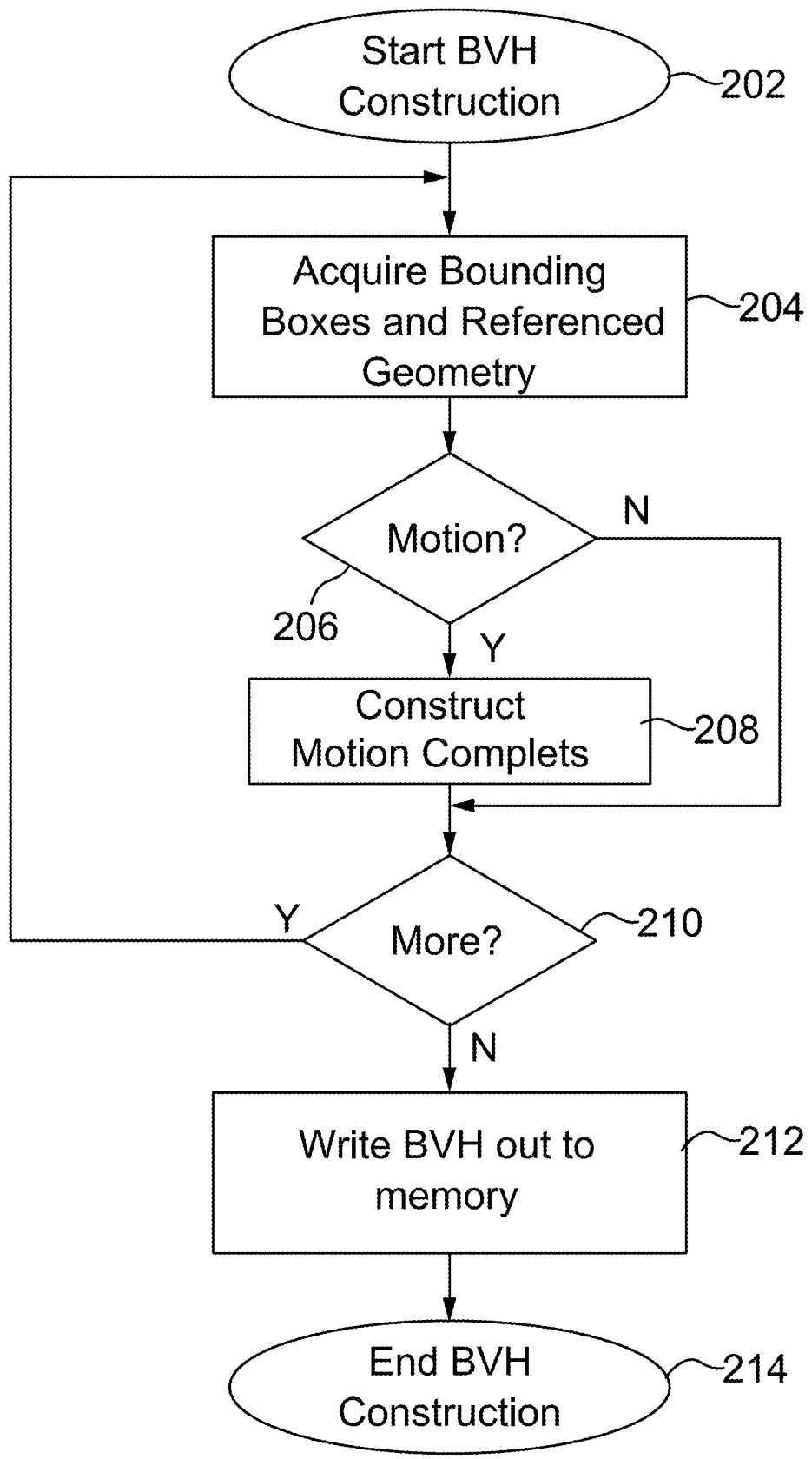
FIG. 3A shows an example process for constructing a suitable bounding volume hierarchy.

The first stage in BVH acceleration structure construction acquires the bounding boxes of the referenced geometry (FIG. 3A, 204). This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches herein can also be applied to more expensive bounding constructs such as OBBs, bounding spheres and other bounding volume technology.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. The BVH construction process for example non-limiting embodiments herein may perform optimizations at this stage to spot, using heuristic or other analytical techniques (which might include artificial intelligence and/or neural networks in some embodiments), those leaf nodes that present poor fits with respect to the geometry they contain. An example embodiment may apply such optimizations (e.g., so-called "multi-box" techniques described in copending commonly-assigned U.S. patent application Ser. No. 16/897,764).

To support motion blur, geometry, either axis-aligned bounding boxes (AABBs) or triangles as described above, is defined at key points. Those key points are stored in the BVH/acceleration structure (AS) such that each AABB bounding volume or triangle under motion has at least two samples in time. Example non-limiting embodiments determine and/or learn (e.g., by developer declaration, machine learning, etc.) whether the geometry represented by the BVH is moving (FIG. 3A, block 206). If the geometry is moving ("yes" exit to decision block 206), the BVH construction process constructs motion compressed treelets (complets) including additional temporal-positional information that the hardware can later use for temporally interpolating bounding volume (see FIG. 4) and geometry (see FIG. 5) positions as described below (FIG. 3A block 208).

In example embodiments, the BVH represents some objects as dynamic objects, and others as static objects. In one embodiment, for purposes of compactness, the BVH represents dynamic and static objects differently. For example, the static objects may be represented using a single set of spatial information (bounding volume locations and vertices) whereas the dynamic objects may be represented using plural sets of spatial information (e.g., bounding volume locations and vertices for different time instants). This enables operations for static parts of the scene to proceed in a normal or typical way not requiring interpolation while applying additional hardware acceleration and new processes to dynamic parts of the scene.

This process continues until all bounding volumes containing geometry have been sufficiently subdivided to provide a reasonable number of geometric primitives per bounding box (FIG. 3A, 210). The real time ray tracer that uses the BVH will determine ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets is written out into a data structure in memory for later use by the graphics processing hardware/software during e.g., real time graphics processing that includes real time ray tracing (FIG. 3A, 212).

Figure 3B:
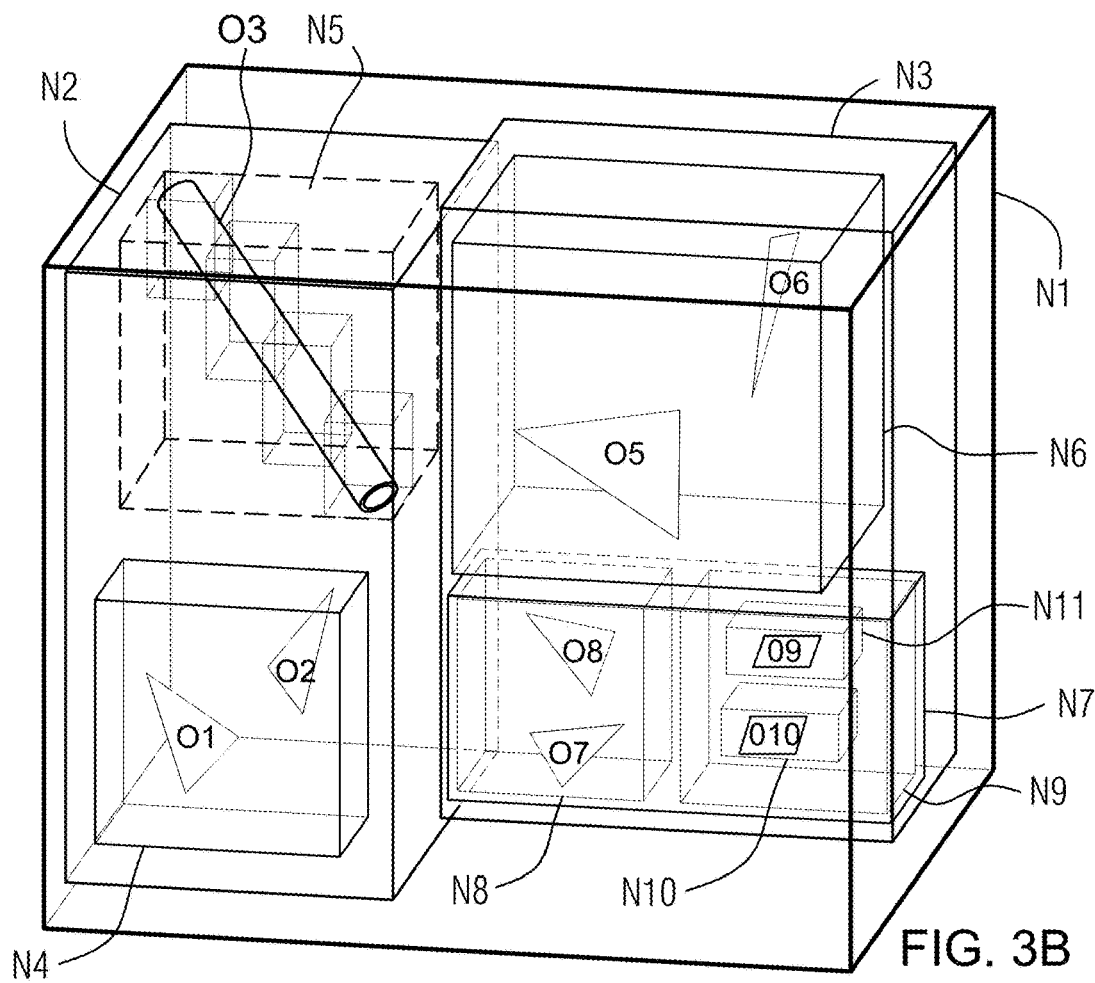
FIGS. 3B and 3C show example bounding volume hierarchy representations.
Figure 3C:
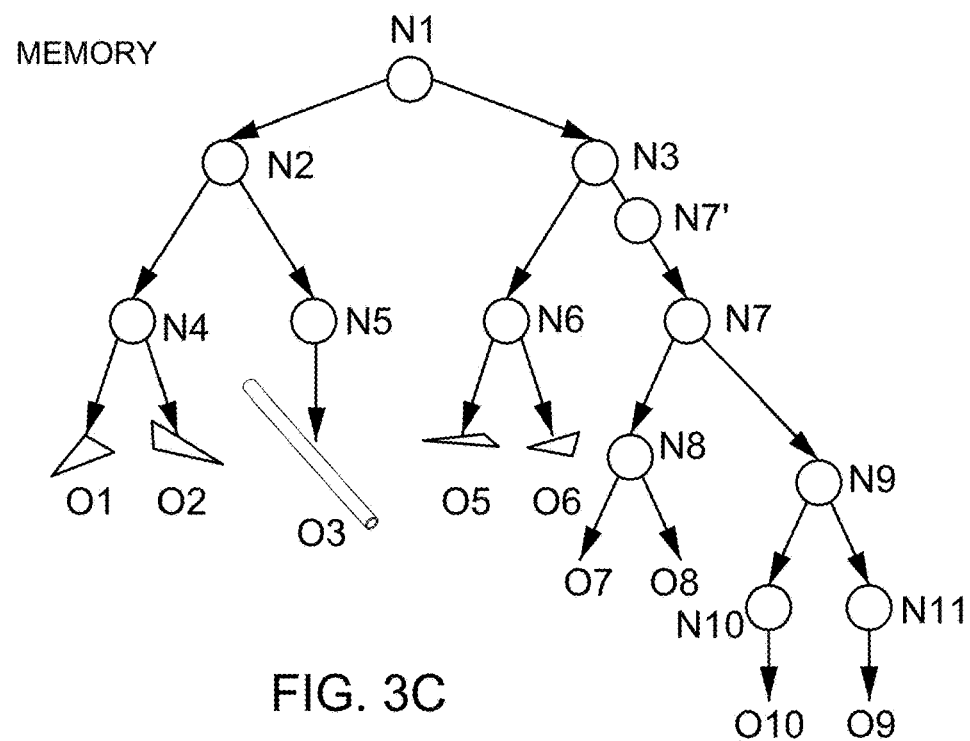

FIGS. 3B and 3C show a recursively-subdivided bounding volume of a 3D scene (FIG. 3B) and a corresponding tree data structure (FIG. 3C) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 3B, bounding volume N1 is subdivided into bounding volumes N2 and N3. Children nodes N2 and N3 of the tree structure of FIG. 3C correspond to and represent the bounding volumes N2 and N3 shown in FIG. 3B. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 3C tree structure correspond to and represent the FIG. 3B bounding volumes N4, N5, N6, N8, N10 and N11 in space.

The FIG. 3C tree in this particular example is only three to six levels deep so that volumes N4, N5, N6, N8, N10 and N11 constitute "leaf nodes"—that is, nodes in the tree that have no child nodes. FIG. 3B shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 3B further shows that leaf node bounding volume N5 contains a single cylinder O3 does not provide a good fit for the AABB bounding volume N5 shown in dotted lines. Accordingly, in an example non-limiting embodiment herein, instead of using the larger AABB bounding volume N5 for the ray-bounding volume intersection test, the system instead tests the ray against a plurality of smaller AABB bounding volumes that are arranged, positioned, dimensioned and oriented to more closely fit cylinder O3.

The tree structure shown in FIG. 3C represents these leaf nodes N4, N5, N6, and N7 by associating them with the appropriate ones of primitive O1-O8 of the scene geometry. To access this scene geometry, the system traverses the tree data structure of FIG. 3C down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space).

In more detail, see https://developer.nvidia.com/rtx/ray-tracing/dxr/DX12-Raytracing-tutorial-Part-1 which describes top (TLAS) and bottom (BLAS) levels of an acceleration data structure and ways to create a BVH using them. In one example implementation herein, for each object or set of objects, a BLAS bounding volume may be defined around the object(s)—and in the case of moving geometry, multiple bounding volumes may be defined for different time instants. That bounding volume(s) is in object space and can closely fit the object(s). The resulting BLAS contains the full definition of the geometry, organized in a way suitable for efficiently finding ray intersections with that geometry.

The BLAS is defined in object space. When creating a BVH, all of those individual objects (each of which are in their own respective object spaces) and associated subtree-lets are placed into world space using transforms. The BVH thus specifies, for each BLAS subtree, transforms from object space to world space. Shaders use those transforms to translate/rotate/scale each object into the 3D scene in world space. In embodiments herein, the hardware in the TTU is what actually performs or accelerates the transforms.

The BVH meanwhile defines the TLAS bounding volumes in world space. The TLAS can be thought of as an acceleration data structure above an acceleration data structure. The top TLAS level thus enables bounding volumes and ray-complet tests, and in one embodiment needs no transforms because the ray is specified in world space. However, in the example non-limiting embodiment herein, the TLAS bounding volumes for objects under motion may also be temporally-encoded with multiple spatial positions to allow hardware circuitry to calculate a particular spatial position at the instant of a ray for purposes of ray-bounding volume intersection testing.

As the ray tracing system traverses downward to a certain point in the tree and encounters an instance node, the mode switches from TLAS (in world space) to BLAS (in object space). The object vertices are in one embodiment defined in object space as are the BLAS bounding volumes (which can be different from the TLAS bounding volumes). The transform information in the complet is used to transform the ray from world space into object space to test against the BLAS subtree. In one embodiment, the same interpolation hardware used for TLAS ray-bounding volume intersection testing can also be used for BLAS ray-bounding volume intersection testing—and different (e.g., higher precision) hardware may be provided for vertex interpolation and ray-primitive intersection testing on the BLAS level.

Acceleration Data Structure Support for Example Non-Limiting Hardware Based Motion Blur Acceleration To support motion blur, geometry, either axis-aligned bounding boxes (AABBs) or triangles as described above, is defined at key points. Those key points are stored in the BVH/acceleration structure (AS) such that each AABB bounding volume or triangle under motion has at least two samples in time.

The hardware uses this information to place that geometry at a specific point in time corresponding to a ray by interpolating between two motion key points. That interpolation could be linear, spherical, normalized linear or other types. In an example implementation, for area reasons, accelerated geometric motion support is limited to linear interpolations of axis-aligned bounding boxes (AABBs) and triangles. But, any other interpolation (e.g., slerp/spherical linear interpolation or nlerp/normalized linear interpolation) can be optionally offloaded to the software-controlled cooperating processor. Interpolation types can also be mixed together in a single Acceleration Structure (AS).

In the past, randomness was used to address temporal aliasing that might have caused a strobing effect. However, there was overhead in updating the BVH for every sample to be performed. In contrast, the present technology and examples support the BVH capturing the range of motion during the frame of all the geometry and putting that in a single BVH and then sampling intervals of time within those ranges of motion within that same single BVH. This avoids the overhead of updating the BVH repeatedly as part of the sampling process as may have been needed in the past. Of course, the technology herein can also work in combination with BVH updating to provide any desired effects and compatibilities.

Example Non-Limiting Real Time Hardware Interpolation

FIG. 4 shows linear interpolation for axis-aligned bounding boxes and FIG. 5 shows linear interpolation for triangle primitives.

The FIG. 4 linear interpolation of bounding volumes in this particular instance comprises access aligned bounding boxes (AABBs). FIG. 4 further shows a low and a high point at time 0 for the bounding box and a low and high point at time 1 for the same bounding box. In the example non-limiting embodiment, the hardware performs a linear interpolation between these low and high point values to provide the low and high points of the bounding box at a time "ts" (timestamp) value specified by an incoming ray.

The example of non-limiting hardware thus moves the geometry to the point in time the ray represents. The hardware can perform this operation using simple interpolation.

FIG. 4A shows example computations performed in hardware to provide the linear interpolation (e.g., using an 8-bit hardware adder circuit, an 8-bit by 24-bit hardware multiplier circuit, 32-bit hardware shift register and rounder circuit, and another 8-bit hardware adder circuit), but many other implementations are possible. In this particular example, "hi" and "lo" are 3×8 bit integers and "ts" may be a full precision (e.g., 32-bit floating point) value (other embodiments might use a 24-bit unorm or other format). The multiplication can possibly be as low as 8×8 (performance dependent). The shift may be performed on only the top 9 bits to reduce area, and would not be required for unorms. The "round" shown is down for "lo" and up for "hi". It should be noted that this hardware may be replicated to provide parallel computations for all three (xyz) dimensions of 3D virtual space; or it could be reused three times to save area but with associated performance decrease.

By way of further explanation, in one example non-limiting embodiment, bounding boxes are stored in lower precision with a higher precision bounding box for the entire set of the compressed tree represented by the complet. In the example implementation shown, interpolation is performed at lower precision before transforming to a higher precision in order to simplify the calculation and save real estate on the chip. Implementing such low precision math in hardware produces a circuit that is much smaller in area and reduces power draw. Thus, the ray-bounding box intersection test may be performed at lower precision to save hardware complexity. However, in example non-limiting embodiments, the ray-primitive intersection test is performed at higher precision in order to more definitively determine whether the ray both spatially and temporally intersects the primitive.

In the example shown, the hardware first calculates the spatial position of the bounding box at the time the ray passes through the scene (in this implementation, as indicated by the ray timestamp). In an example non-limiting implementation, the hardware interpolates—using low precision math—between the low precision 0 and 1 end points of the bounding box in order to determine the position of the bounding box at the instant in time represented by the ray. Then, in one non-limiting example, the actual intersection test to determine whether the ray intersects that bounding box is performed at a different, higher precision. In such implementations, the bounding box is represented in the complet in low-precision compressed form, and the hardware converts the bounding box location to higher precision in order to perform a ray-box intersection test.

In one example non-limiting embodiment, the bounding box interpolation shown in FIG. 4A is performed at low precision before converting the lower precision bounding box coordinates to higher precision in order to reduce hardware complexity. The hardware may then proceed in some implementations to convert to the interpolated box coordinates into higher precision for purposes of the ray-to-box intersection test. The example computations shown in FIG. 4A thus perform the interpolation using low-precision (e.g., 8-bit) components, and then convert the results to higher precision in order to perform the ray-box intersection.

Because the example non-limiting implementation uses the low-precision interpolation process shown, it may be desirable to make the bounding volumes slightly more conservative to ensure that no intersections are missed. This can be performed by the rounding shown (round down for low, round up for high) to take the lower precision interpolation computation into account. Such rounding guarantees that no matter what time the ray comes in, the bounding volume it is tested against for intersection is guaranteed to include the relevant geometry at that time. If the interpolation is done wrong, the corners of the primitive may stick out of the math-generated bounding volume produced by the low-precision interpolation. To avoid that problem, the computation for the moving direction shown rounds down the low values and rounds up the high values. This ensures that the bounding volume calculated by interpolation remains conservative and is guaranteed to bound the geometry. It should be noted that if the object is moving in the opposite direction than that shown in FIG. 4, the rounding should be the opposite (i.e., round up for low, round down for high) to provide the requisite bounding guarantee. Once again, the functions of FIG. 4 and the hardware of FIG. 4A may be replicated for computing additional dimensions in parallel to provide concurrent intersection testing in all three dimensions of virtual space.

In another example implementation, a single bounding volume might be used to encompass the entire range of motion of the primitive and thus dispense with any need to interpolate between the bounding volume based upon ray time. In such implementations, the FIG. 4 representation of the sweep of the triangle primitive through space could be represented as a single, swept-volume primitive (in this case a 3D prism). In other words, the bounding volume will be used to initially encode all volume swept by the moving geometry as it moves through the scene from time 0 to time 1. In such implementations, it would be possible to test the ray intersection against the swept volume of the primitive and then sort out the time factor using another mechanism. For example, one possible way would be to determine where the ray intersected the extruded primitive and use this information for the time-based intersection test. This simplification of bounding volume calculation comes at the expense of testing many more ray-primitive intersections, but some implementations may need such results for other purposes.

FIG. 5 shows an example primitive (in this case a triangle) that exists at a certain location in the scene at time 0 and moves to a different location in the scene at time 1. The example shown, all three vertices are represented at full precision. Hence, in this example, a full-precision computation performed by hardware circuitry is used to interpolate the positions of the three vertices of the primitive at the time specified by the ray. FIG. 5A shows this hardware circuitry, which includes a full precision adder circuit "FADD" and a full-precision multiply-and-add circuit ("FFMA"). As shown, this hardware circuitry can be replicated for y and z dimensions to provide concurrent parallel interpolation in all three dimensions (or in other implementations, area can be saved by reusing the hardware circuitry seriatim for each of x, y and z interpolation calculations but at decreased performance).

While the interpolation shown in FIG. 5A is linear, in other implementations it may be desirable to have a more complex interpolation such as based on a polynomial which better captures the motion of the primitive in space. For example, it might be desirable in some implementations to interpolate around a curve such an Bezier curve, a quadratic or any other path in space. To increase capabilities and provide more complex interpolation, the hardware computation may need to be more complex and in addition the object representation could be expanded to include not just the position of each vertex of the primitive at both the start and end points of the time interval, but also the slope of the movement path at each of those start and end points. Meanwhile, the bounding volume interpolation shown in FIG. 4 should be sufficiently conservative to be guaranteed to enclose the moving primitive when the primitive moves along a non-linear, more complex path.

In one embodiment, the bounding box test is provided to be conservative, whereas the object intersection test is computed to be exact. This is because in one embodiment, the bounding volume test intersecting with the ray simply needs to guarantee that the test result will be positive when the ray actually does intersect the enclosed primitive (but can also and often will be positive when the ray does not intersect the enclosed primitive without adverse impact on visualization), but the ray-primitive intersection test must be exact because this is the test result that is used for visualization.

While FIGS. 4 and 5 show translation only, one skilled in the art will understand that should be recognized as being able to be interpreted more generally to include rotation and/or scaling and/or transforming. Thus, the example non-limiting process described can be used for geometry that is translating and/or changing size and/or rotating and/or deforming—that is, any kind of motion.

Irrespective of how the geometry is transformed (i.e., translation, rotation, deformation and/or scaling), the same interpolation can be used to determine the position of the geometry at the instant of the ray. In the case of deformation, the vertices may move independently in any direction and thus FIGS. 4 and 5 are sufficiently general to encompass rigid body motion as well as geometric deformation. The hardware linearly interpolates each vertex (in parallel, in example implementations) to accommodate all such possibilities. This will result in an interpolated primitive which exists at the specified resultant vertex positions at the instant of the ray.

Using the hardware-based technology herein provides the flexibility to shoot rays selectively for each pixel in real time or close to real time. Thus, the example non-limiting embodiments can shoot rays based on a random or pseudo random schedule to discover the intersections that would otherwise not be detected using a fixed interval schedule. Even in instances where a number of fixed interval samples per pixel is increased to be in the thousands per frame, the result may be aliasing due to correlation between pixel sampling. A good way to avoid this is to use a smaller number of random (in time) intersection tests for each pixel so that there is no correlation between sampling times across different pixels. It is also possible to pick different sampling times for different ray types. While in one embodiment random stochastic sampling may be used to address temporal aliasing, the technology here is not limited to random sampling. In other implementations, other types of sampling that are non-random might be used. The corollary in space is to sample at different positions within a pixel. This reduces aliasing, as is well known. While such approaches work fine for spatial anti-aliasing, attempting to perform temporal processes to reduce temporal aliasing tends to produce a strobing effect. Therefore, randomness tends to be more important when reducing temporal aliasing than it is when reducing spatial aliasing.

The number of samples and thus the number of rays used to temporally reduce aliasing relates to noise reduction. To get a completely noise free image may take a very large number of samples. It is therefore often a trade-off between the quality of the resulting visual effect and the processing time, since a very low noise result may require a very large number of samples and commensurate longer processing times. It is also possible to estimate the variance of a pixel and/or its neighbors to determine the amount of noise, and to adaptively add additional samples/rays for purposes of noise reduction only on those areas of the image that need it.

Because such motion blur processing is so computationally intensive, in the past it was necessary to give up a real time speed advantage of real time graphics hardware if one were to produce such a motion blur. This has led developers in the past to fall back to a software-based, much slower than real time approach for at least some kind of motion blur. In contrast, the technology herein is able to keep that work on the hardware by supporting the dynamic transform and deforming geometry in the way the ray is handled and intersected with geometry within a hardware-based tree traversal unit.

In example non-limiting embodiments, hardware may perform interpolation for a number of bounding volumes in parallel in order to increase effective processing speed. In some example limitations, at any point during the processing the hardware can transfer the interpolation task back to a software-based cooperating processor if needed for more complex processing the hardware is not capable of performing itself. As an example, instead of performing primitive/geometry interpolation in hardware, the hardware could transfer this task back to the software-based processor to perform the interpolation instead. In some example embodiments, for example, to save area, the hardware may be capable of or configured to perform only simple interpolation such as linear interpolation. If particular geometry required more complex interpolation algorithms, such interpolation tasks can be transferred back to the software-based processor for more flexibility. There is a trade-off between hardware complexity and speed; while it typically takes more time to transfer tasks such as interpolation back to a software-based cooperating processor, the software-based processor can provide a high degree of flexibility in terms of which operations are performed. On the other hand in other implementations, it may be desirable to provide both, for example, linear and some form(s) of non-linear interpolation or other calculations at the hardware level so the hardware can perform the calculations without transferring the task back to a software-based process. Linear interpolation may, in some implementations, cover most of the use cases and provide a worthwhile trade-off between hardware complexity and overall performance, but other design decisions are contemplated.

In example non-limiting embodiments, it is only necessary to generate a BVH once because the BVH accounts for motion of all objects it represents within a given virtual shutter frame interval. The technology is not limited to representing all objects within a shutter frame interval, however. For example, it could be desirable in some implementations to use a BVH to temporally represent objects using shorter motion-based time intervals, and combine the results of multiple BVH representations in a common motion blur analysis. Thus, example non-limiting embodiments provide hardware that is parameterized for whatever length of time a developer needs. In many common applications, such parameters from 0-1 may represent the length of a virtual camera shutter interval, but other uses and applications are possible. As one example, shorter time intervals might be used to provide more intersections for input to a special-purpose interpolation other than linear interpolation.

Advantageous non-limiting example implementations may include real time and close to real time graphics generation. Some use cases to provide both spatial and temporal antialiasing may require, for example, on the order of 400 samples per pixel. Hardware existing at the time of the filing of this patent may be unable to provide such rapid sampling in real time. However, as hardware designs advance and become faster, it will soon be possible to sample sufficient values for each pixel of a high resolution image in real time to provide adequate numbers of samples for both spatial and temporal antialiasing. In the meantime, the technology described herein is very useful in close to real time or other non-real time applications such as movie making in order to drastically reduce the time needed to generate each image of a scene, thereby reducing overall rendering time. It is still possible to combine the techniques herein with a post-processing filter to provide additional and/or different motion blur effects that do not rely on intersection sampling of the ray intersections used to produce the underlying image.

Adaptive sampling is another useful technique that could be used to sample pixels that need sampling more often than pixels that require less sampling (e.g., the faster the motion under a pixel, the more samples for that pixel are used). However, there will always be a potential case where an object moves entirely across the image field within one frame. Therefore, it may be difficult to achieve consistent performance using adaptive sampling alone unless the system constraints are such that image quality reduction is acceptable and/or frame rate can be reduced as needed. But this depends on the particular implementation and associated constraints.

In one example non-limiting embodiment, there is no separate mechanism for turning off motion blur for a ray other than the setting of the ray's timestamp. All motion ranges are defined as the inclusive range [0.0, 1.0]. A ray timestamp outside of that range, i.e., negative or greater than 1, will miss any and all motion blur content, though still hit static content. At the ends of the range, a value of exactly 0.0 or 1.0 is guaranteed to select just the AABB or triangle specified at either the beginning or the end of the time interval respectively. Note that a value of negative 0.0 is considered outside of the range.

Example System Block Diagram

The following describes an overall example non-limiting real time ray tracing system with which the present technology can be used. In particular, while the acceleration structure constructed as described above can be used to advantage by software based graphics pipeline processes running on a conventional general purpose computer, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs"—subunits of one or a group of streaming multiprocessor SMs of a 3D graphics processing pipeline. The following describes the overall structure and operation of such as system including a TTU 138 that accelerates certain processes supporting interactive ray tracing including ray-bounding volume intersection tests, ray-primitive intersection tests and ray "instance" transforms for real time ray tracing and other applications.

Figure 6:
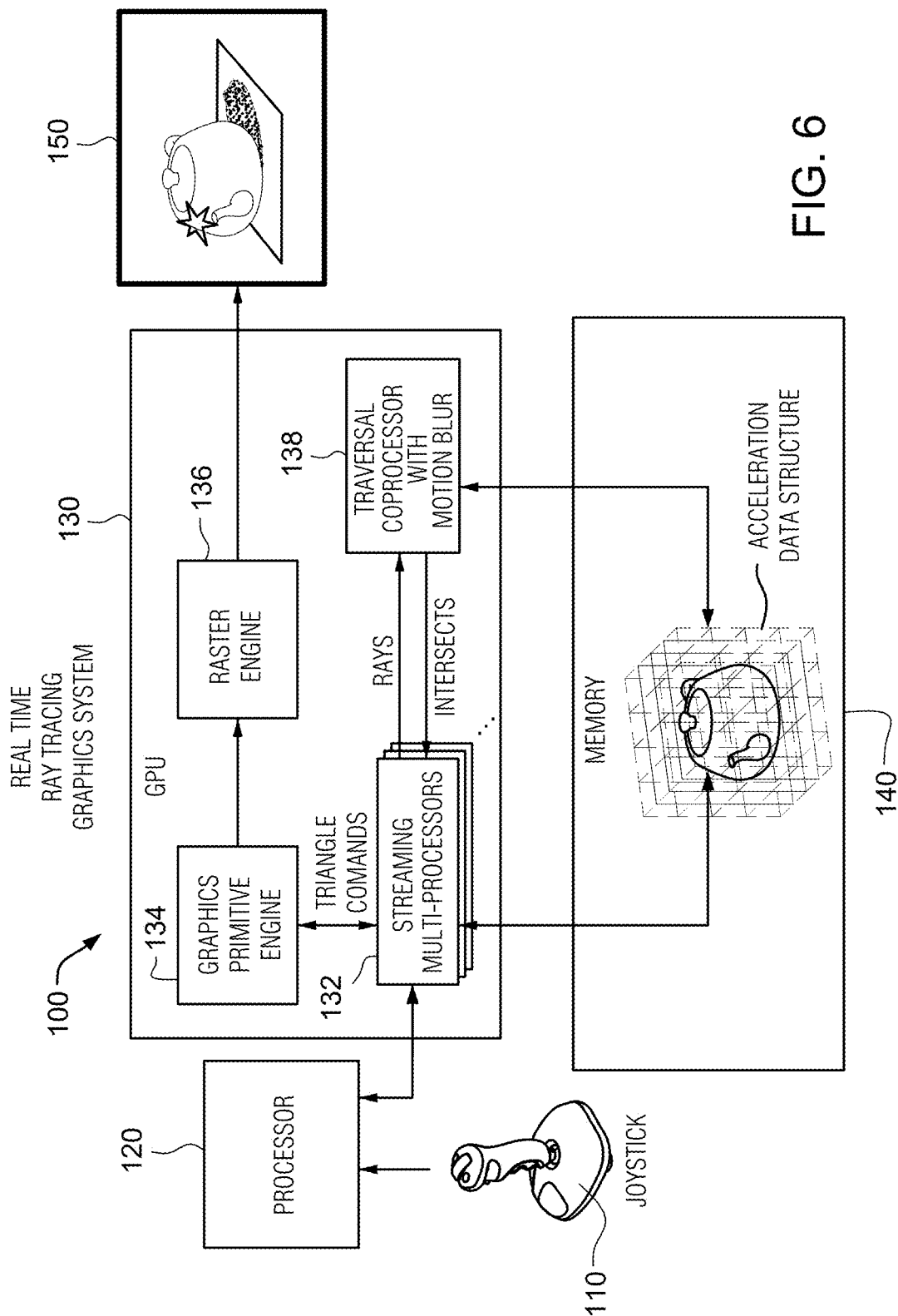
FIG. 6 illustrates an example non-limiting ray tracing graphics system.

FIG. 6 illustrates an example real time ray interactive tracing graphics system 100 for generating images using three dimensional (3D) data of a scene or object(s) including the acceleration data structure constructed as described above.

System 100 includes an input device 110, a processor(s) 120, a graphics processing unit(s) (GPU(s)) 130, memory 140, and a display(s) 150. The system shown in FIG. 6 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable high performance processors that can be referred to as "streaming multiprocessors" ("SMs") 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms. A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given a BVH constructed as described above, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform ray-bounding-volume intersection testing without the need to ask the calling SM for help). In addition to tracing rays, the TTU 138 is capable of performing more general spatial queries where an AABB or the extruded volume between two AABBs (which we call a "beam") takes the place of the ray. Thus, while the TTU 138 is especially adapted to accelerate ray tracing related tasks, it can also be used to perform tasks other than ray tracing.

The TTU 138 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Ray Tracing Processes

Figure 7:
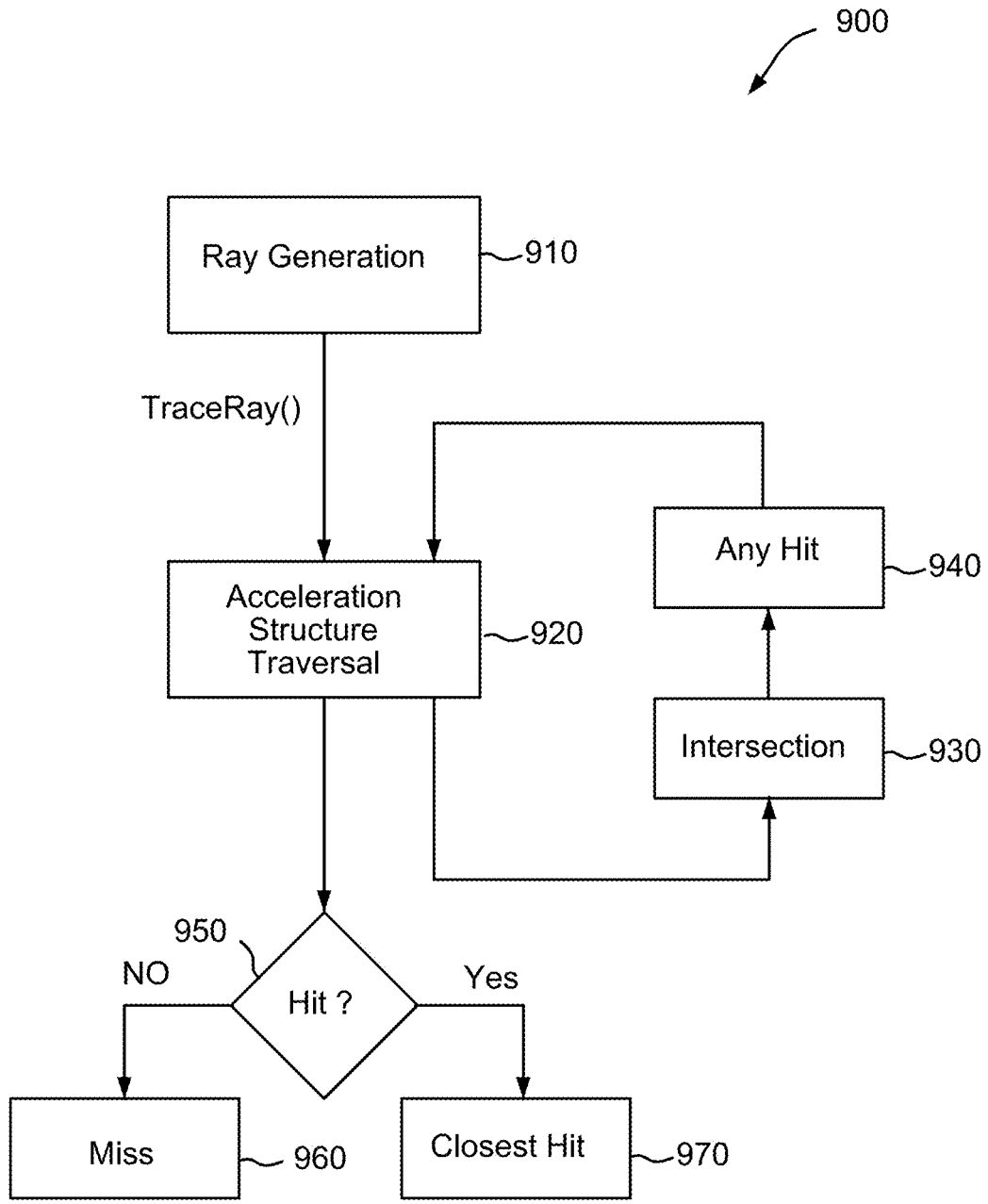
FIG. 7 is a flowchart of an example non-limiting ray tracing graphics pipeline.

FIG. 7 shows an exemplary ray tracing shading pipeline 900 that may be performed by SM 132 and accelerated by TTU 138. The ray tracing shading pipeline 900 starts by an SM 132 invoking ray generation 910 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 7 block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 138 ray-primitive test block 720 performs an intersection 930 process to determine whether the ray intersects the primitives. The TTU 138 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 138 may return multiple intersections with different geometry in the scene in arbitrary order.

Figure 8:
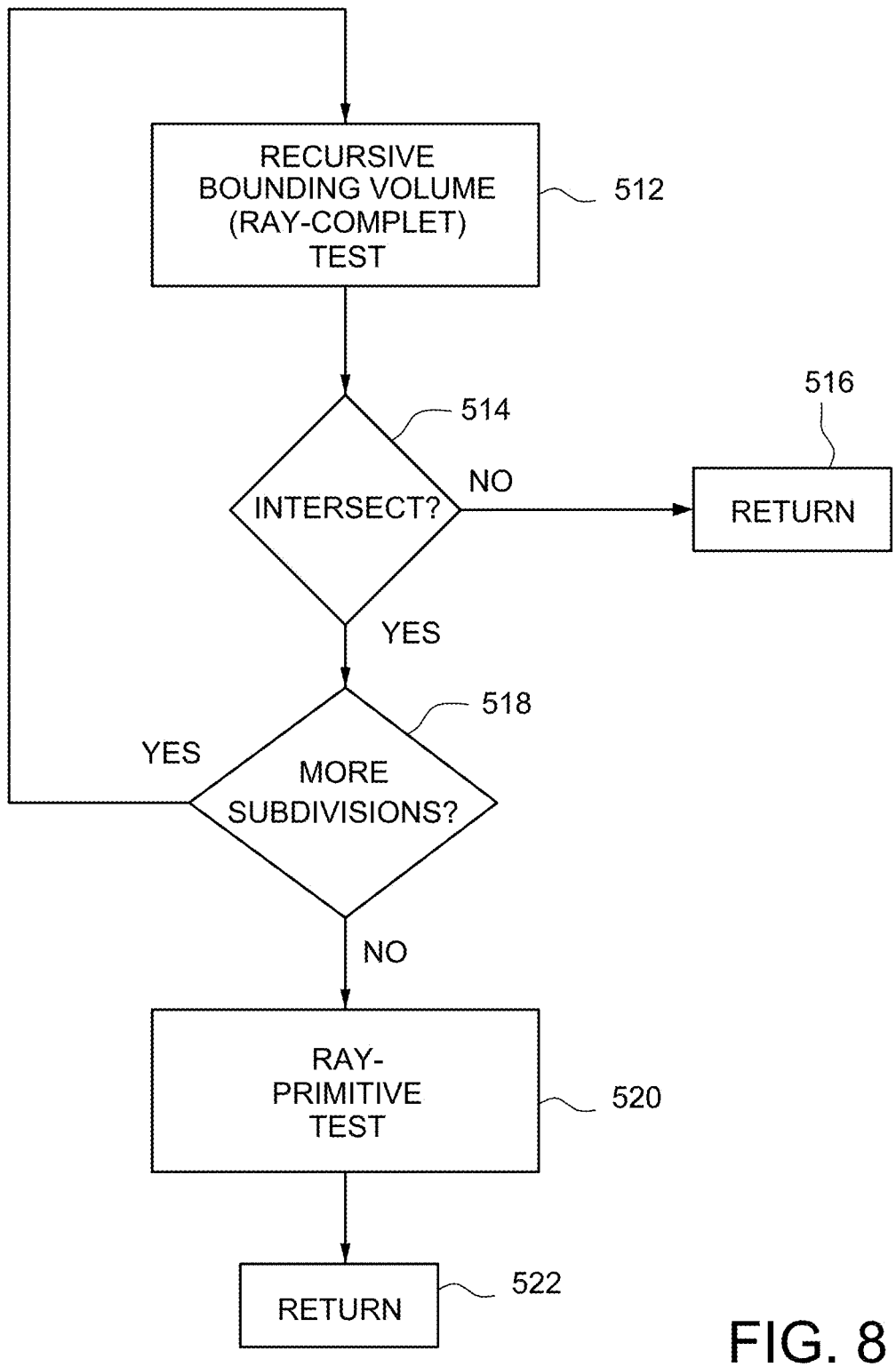
FIG. 8 is a flowchart of example non-limiting hardware based ray tracing operations.

FIG. 8 is a flowchart summarizing example ray tracing operations the TTU 138 performs as described above in cooperation with SM(s) 132. The FIG. 8 operations are performed by TTU 138 in cooperation with its interaction with an SM 132. The TTU 138 may thus receive the identification of a ray from the SM 132 and traversal state enumerating one or more nodes in one or more BVH's that the ray must traverse. The TTU 138 determines which bounding volumes of a BVH data structure the ray intersects (the "ray-complet" test 512). The TTU 138 can also subsequently determine whether the ray intersects one or more primitives in the intersected bounding volumes and which triangles are intersected (the "ray-primitive test" 520)—or the SM 132 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the TTU 138 can return this result to the requesting SM 132. This is because if a ray misses a bounding volume (as in FIG. 2A with respect to bounding volume 310), then the ray will miss all other smaller bounding volumes inside the bounding volume being tested and any primitives that bounding volume contains.

If the bounding box test performed by the TTU 138 reveals that the bounding volume is intersected by the ray ("Yes" in Step 514), then the TTU determines if the bounding volume can be subdivided into smaller bounding volumes (step 518). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by TTU 138 recursively applying steps 512-518.

Once the TTU 138 determines that the bounding volumes intersected by the ray are leaf nodes ("No" in step 518), the TTU 138 and/or SM 132 performs a primitive (e.g., triangle) intersection test 520 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

Figure 9:
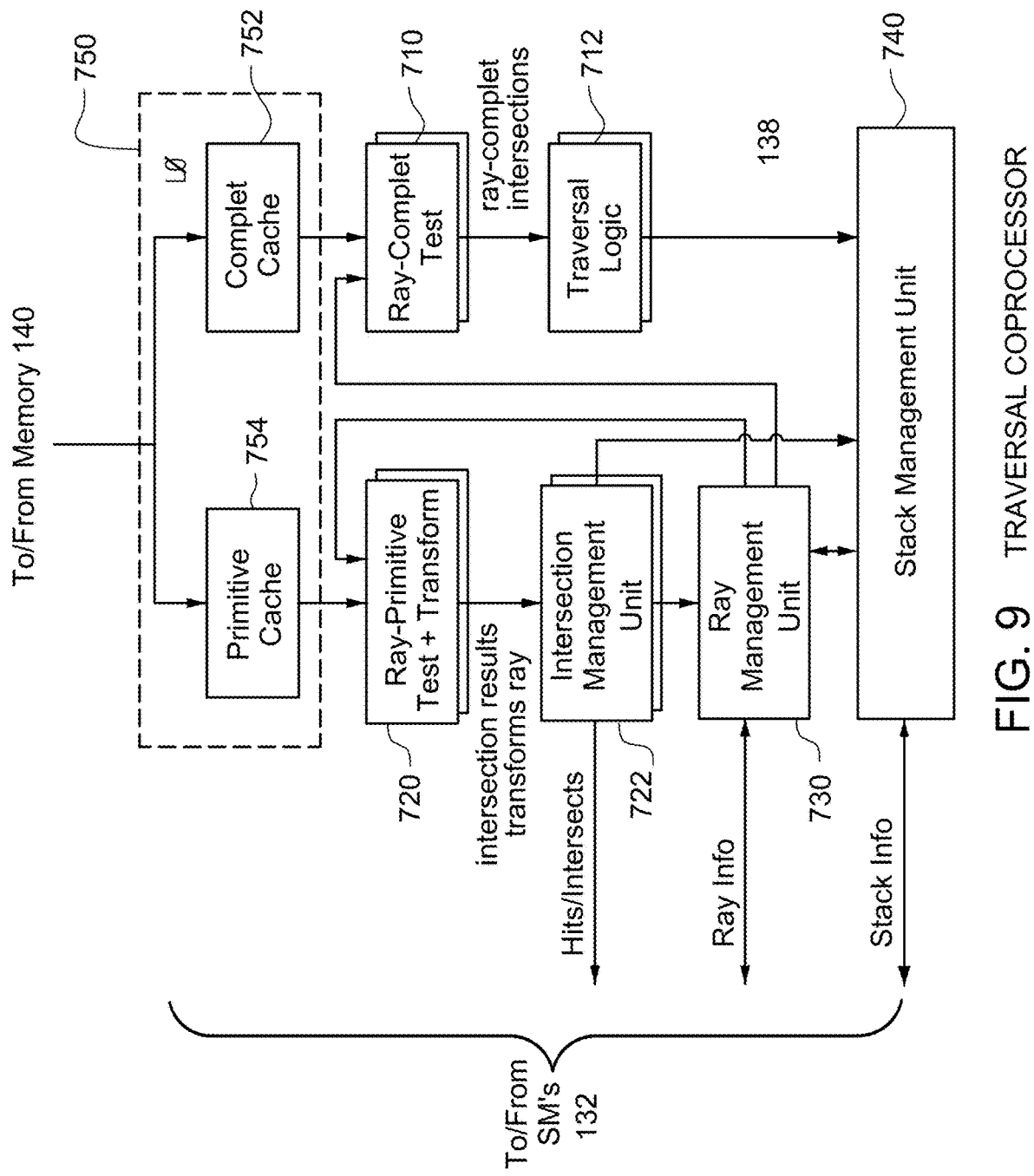
FIG. 9 shows a simplified example non-limiting traversal co-processor comprising a tree traversal unit (TTU).
Figure 10:
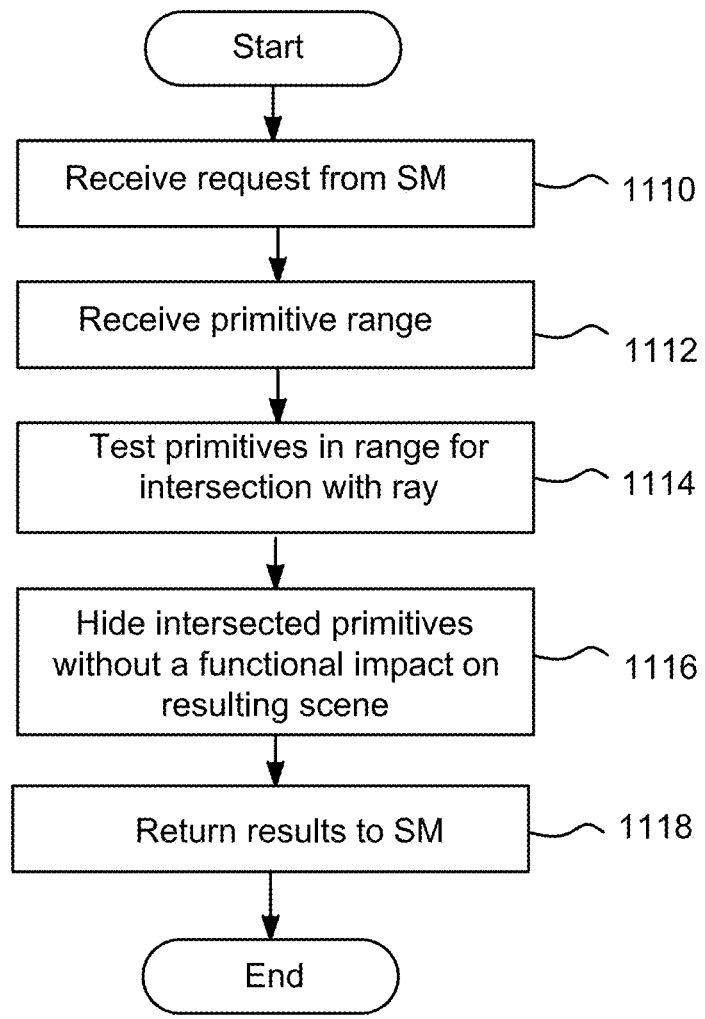
FIG. 10 is a flowchart of example TTU processing.

FIG. 9 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node primitives and mid-traversal return of alpha primitives and unsupported leaf node primitives (items). The TTU 138 includes dedicated hardware to determine whether a ray intersects bounding volumes and dedicated hardware to determine whether a ray intersects primitives of the tree data structure. In the example shown, the linear interpolation for ray-bounding box test shown in FIGS. 4, 4A is performed in the ray-complet test box 710. In example non-limiting embodiments, the interpolation shown in FIG. 5, 5A for the primitive may be performed in the ray-triangle test box (RTT) 720.

In more detail, TTU 138 includes an intersection management block 722, a ray management block 730 and a stack management block 740. Each of these blocks (and all of the other blocks in FIG. 9) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block 740 pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 138. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 138 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 138 may request the BVH data structure identified in the query to be retrieved from memory outside of the TTU 138. Retrieved portions of the BVH data structure may be cached in the level-zero (L0) cache 750 within the TTU 138 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Ray-Primitive Intersection Testing

Referring again to FIG. 9, the TTU 138 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 138 in some embodiments may not be able to help with the ray-primitive intersection testing. In such cases, the TTU 138 simply reports the ray-complet intersection test results to the SM 132, and the SM 132 performs the ray-primitive intersection test itself. In other cases (e.g., triangles), the TTU 138 can perform the ray-triangle intersection test itself, thereby further increasing performance of the overall ray tracing process. The following describes how the TTU 138 can perform or accelerate the ray-primitive intersection testing.

As explained above, leaf nodes found to be intersected by the ray identify (enclose) primitives that may or may not be intersected by the ray. One option is for the TTU 138 to provide e.g., a range of geometry identified in the intersected leaf nodes to the SM 132 for further processing. For example, the SM 132 may itself determine whether the identified primitives are intersected by the ray based on the information the TTU 138 provides as a result of the TTU traversing the BVH. To offload this processing from the SM 132 and thereby accelerate it using the hardware of the TTU 138, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 720 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 720.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing. Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Example Non-Limiting Data Structures

The following describes new or enhanced ray tracing data structures used to support motion blur in some embodiments.

Example Non-Limiting Motion Complets:

In example non-limiting embodiments, a new compressed treelet representation/format is used to specify the beginning and end times for which the treelet-represented geometry exists. These beginning and end times are used for interpolation. Acceleration data structures not under motion can use more compressed formats that do not include the time encoding and additional geometry location information. For example, an object that is completely static does not need to be represented with beginning and end location information. Objects under motion, on the other hand, may include this additional information to allow interpolation within the time interval for which the geometry is valid, but at a cost of reduced compression (which is still better than requiring two entirely different acceleration data structures, especially in cases where the hardware can access only one acceleration data structure at a time).

In example non-limiting embodiments, only the geometry which has motion needs to be captured with a new complet format. All the static geometry can be represented using more compressed complet formats, and static and under-motion geometry complets can be mixed and matched within the same BVH. In such cases, static geometry will be hit by a ray with any timestamp. In such instances, the timestamp effectively becomes a no-operation (NOP).

In example non-limiting embodiments, the complet can represent geometry that exists in the scene only in a part of the duration the complet applies to, and the geometry then disappears or otherwise does not exist during the other part of the time interval. For example, when the acceleration data structure supports instancing, each instance may have its own time duration and different instances can have different time durations/intervals.

In more detail, in example non-limiting embodiments, the compressed treelet (complet) format that encodes the AABBs is updated to indicate motion. FIG. 12 shows a new complet formats with a "format" field that selectively enables motion blur. For example, if "format"=1 or "format"=3, motion blur is enabled (format=3 can specify both motion blur and multibox are enabled), and if "format"=0, motion blur is not enabled. In one example non-limiting embodiment, motion content may be orthogonal to multi-box content allowing for multi-box motion (U.S. Pat. Ser. No. 16/897,764). Similarly, the motion interpolation described herein in one embodiment supports the triangles with shared edges (see U.S. Pat. Ser. No. 16/901,023), and triangle pair intersection efficiencies also could work with motion interpolation. In particular for example, using such technology the motion interpolation of a shared vertex avoids the redundant computation for that same vertex in the second triangle in a pair.

Figure 14A:
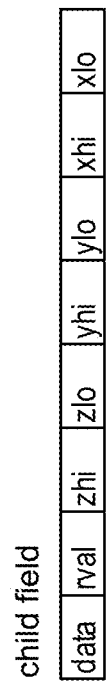
FIGS. 14A, 14B are schematic illustrations of example complet child fields.
Figure 14B:
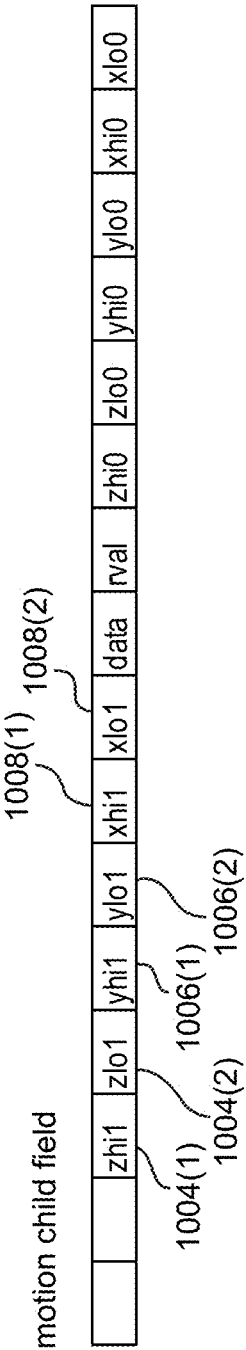

In one example embodiment, when the complet format is 1 or 3, then a conceptual motion pair child is created. The complet of FIG. 13A is the current standard and the complet of FIG. 13B is the motion format. The FIG. 13B format includes motion children 1002(0), 1002(10) that each combine fields from both an even and odd non-motion child, where data and rval are only valid for the even box, and invalid/valid is based solely on the even box. See FIGS. 14A, 14B. When enabled, two adjacent children are used as a motion blur pair. For example, child0 represents the bounding box at timestamp 0.0 and child1 represents the bounding box at timestamp 1.0. In this way, the effective maximum number of children is reduced from 12 to 6. When motion blur is enabled for a complet, all children are treated as motion blur. There is no distinction made for leaves.

In more detail, the representation of motion in example non-limiting embodiments of an acceleration data structure allocate two child bounding boxes in a legacy complet format to the beginning and end location representations of the bounding volume within a specified parameterized time interval. In the example shown, child one of the FIG. 13A legacy format may represent the start location of the bounding volume and child two of the legacy format may represent the ending location of the same bounding volume. FIG. 13A shows an example of a content of a non-motion child within the complet as compared to the content of the motion child within the FIG. 13B motion complet.

In one example non-limiting embodiment, an actual time interval may be stored in an unused location across all of the children. This alternative implementation may cause some additional complexity in the hardware but may be useful in some implementations to provide additional flexibility (i.e., to provide timing encoding for each individual child in the complet). Such implementation can for example use time interval parameters other than 0 and 1 and instead parameterize any arbitrary start and end time within the interval. If such implementation is used, an additional hardware computation may be used to map the information stored in the complet into the results of the interpolation.

Figure 15A:
FIGS. 15A, 15B are schematic illustrations of example long pointer data fields.
Figure 15B:
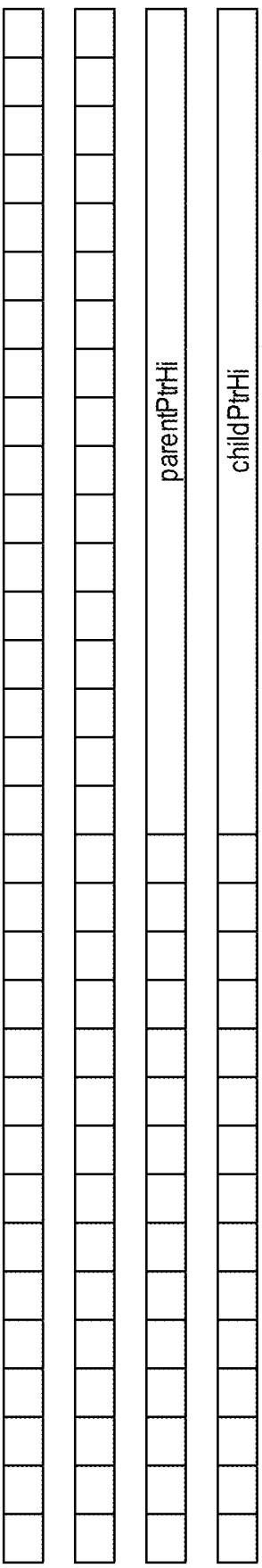

If longPtrData is used, then in one embodiment all of motion child 10 shown in FIG. 13B is invalid even though only the fields in what was child 11 are used for long pointers. That is, the motion long pointer data field may have the same size as the motion child. See FIGS. 15A (legacy long pointer data), 15B (motion long pointer data).

It is assumed that any bottom-level acceleration structure ("BLAS") has a single setting for each end point for all geometry in that BLAS. It is up to the transform mechanics to properly clamp the timestamp to 0.0 and/or 1.0 for clamp mode or to allow it outside of that range for vanish. Such clamping can be done in hardware and/or in software. In one example current implementation, that effort is done on a cooperating software-based processor in software but could be done in hardware in future versions.

In some non-limiting embodiments, a new "force-return-to-processor" bit, flag or indicator is added to the data field of instance node complets. When this bit, flag or indicator is set, the instance node will force a "return-to-processor" mode if the mode would otherwise be "process-in-hardware". This behavior is not restricted to motion complets; this bit, flag or indicator can be used for any transforms that need to be processed in the software-based processor including for example motion transforms, static transforms with a motion range change, or even other uses like extended visibility tests. Meanwhile, a transformed ray can be written directly back into the hardware and traversal can start in a bottom level stack without doing a transform on the processor. This eliminates the need for the bottom-back-to-top transition from having to go back to the processor.

A bit in the complet specified per-instance node child thus can be used to force a return to processor on intersection. See FIG. 16, "frts". This allows each individual transform to be marked as a motion transform without having to use Ray Ops. If an instance transform can be done using the existing transform mechanism, it can still run on the hardware even though the underlying or preceding content was motion. This also allows any cross product of TLAS, BLAS, and Transform versus motion and static. E.g., Motion TLAS to Motion BLAS via Motion Transform, Motion TLAS to Motion Blas via Static Transform, Static TLAS to Static BLAS via Motion Transform, or Static TLAS to Motion BLAS via Motion Transform, etc.

Figure 16:
FIG. 16 is a schematic illustration of an example data field.

FIG. 16 shows an example complet data field with a "forced return" option that can force the hardware to return intermediate results to the software-based cooperating processor for further processing. The FIG. 16 "frts" (force return to SM) field is added for each instance node in one example implementation. This forced return value specifies whether the particular instance node needs to be returned to the software-based cooperating processer for further processing as a result of the ray operation. The example shown provides an additional, independent mechanism that allows the BVH designer to specify that this particular object instance has a transform that needs to be handled in software rather than in hardware, thus forcing a return from the hardware to the software based processor for further processing.

For example, in one non-limiting implementation the TTU may be provided with sufficient capability to perform transforms for deforming geometry but in order to save real estate, is not provided with the capability to transform certain kinds of translating geometry (or vice versa). In such circumstances, the BVH can be structured to force the hardware to return the geometry to the cooperating processor for transformation of the geometry before the hardware conducts the ray-primitive intersection test.

Another potential reason to force a return to the software-based processor is if the time interval is changing. In one non-limiting example, the top level of the acceleration data structure should capture the entire 0 to 1 time interval of the frame. However, subtrees within the accelerated data structure could capture only sub-intervals of the overall time interval, and alternate subtrees may be used to capture or represent different sub-intervals. For example, an object may only be moving for a part of the overall time interval represented by the acceleration data structure and may be static or may not exist for other parts of the interval. There may therefore need to be a mapping between the top level time parameters and the lower level time sub-parameters. Such mapping can flexibly and conveniently be performed by the software-based processor to relieve the hardware of undue complexity.

Example Non-Limiting Moving Triangle Block Representations:

FIGS. 17A-17E show how one example non-limiting implementation specifies geometric primitives. The particular format shown may be used specifically for a motion blur primitive such as a motion blur triangle. Example non-limiting embodiments introduce a new triangle block compression format for motion blur triangles. The formatting shown in FIGS. 17A-17E is nearly identical to the legacy compressed triangle format but with significant differences, including:

(1) A new format mode of "2: motion blur tri" is introduced (FIG. 17B, "Mode" field), (2) Each motion blur triangles has 6 vertex indices v[0,1,2].[start, end], which means x bits per triangle in the vertex index section instead of just y bits (or 2 for the first triangle) (see FIG. 17E), and (3) Triangle 0 no longer has implicit vertex indices.

Example Non-Limiting Instance Node Representations:

While the hardware in some example embodiments will not process a motion transform, it can process a motion transform instance node so as to initialize all but the transformed ray origin and direction. To support this, motion transform instance nodes that are interleaved with static transform instance nodes may be constructed to have the same header information. To allow distinguishing between static transform instance nodes and motion transform instance nodes, an example non-limiting embodiment introduces a new header format "ext" field value (see FIG. 18A) of e.g., "1".

See FIGS. 18A-18C which shows example non-limiting changes to the Instance Node format with the introduction of the "ext" field of FIG. 18A and associated behavior. Additionally, the FIG. 18B layout can include a new "format" field value specifying an extended header (when the format field value is e.g., "1", then an extended header is used), and the FIG. 18C extended header field may specify a user format.

The FIG. 18C extended header is in one embodiment located in what were the lower bits of other fields such as the rootCompletPtr. Those lower bits have in legacy implementations been "treated as zero", and so we can safely reuse them for the extended header. All of these lower bits are reserved for the extended header. The lowest certain number of (e.g., 2) bits are defined as 'userFormat' and are reserved for software use. The hardware will not use or touch these bits. Software though can use them for distinguishing types of instance nodes and what needs to happen when that instance node is returned to the software-based processor.

In one example implementation, a 'userFormat' of 0 could indicate an instance node format larger than a certain size (e.g., 64B) with additional header information in the other 64B block(s). A setting of 1 could indicate a single (e.g., 64B) node with additional information stored elsewhere that needs to be looked up based on the instance index. A setting of 2 could indicate that the transform requires an extended visibility check. Again, these are example uses; the software is free to set and use those particular bits however it needs to.

Instance Nodes

FIGS. 19A-19E show sample instance node layouts that could be used. In one example implementation, the FIG. 19A static instance node may be hardware-encoded, and anything beyond the first portion can be freely defined however needed. These are only presented as non-exhaustive samples of what can be done.

One example implementation structures the specifications under the motion instance node in a way that provides the same information and processing as for a static instance node (see FIG. 19A) but with an additional extension bit (see top line "ext" field of FIG. 19B) specifying what extension is present. It is thus possible to use the top (static) bits to process a transform inside the hardware, and so an implementation does not need to do the math to transform the ray from world space to object space but does do the mechanics of pointing to the new root complet in the bottom level of the acceleration data structure and then traversing there in hardware. In some embodiments, it is possible for the hardware to use the "force return to SM" mechanism to hand back to the software-based cooperating processor a request to "do this instance node" so the processor (SM) can perform the transform on the instance node and hand the result back to the hardware to permit the hardware to just continue going as if the instance node had been transformed on the hardware. Alternatively, the example non-limiting implementation can perform a combined static and motion-based transform to mix and match both motion based and static scenarios. The extension thus allows the software to specify what is being done with the instance and what the data means. The hardware has the flexibility to flexibly specify the length of the instance node representation, so the FIG. 19B-19E instance node formats can have different lengths depending on need. The hardware may process as if the bottom part of the representation does not exist and just operate on the top data; or it can process as if only everything other than the top row exists; or it may process both the top part and the extension part. The data may thus be structured in example non-limiting implementations to accommodate multiple uses and hardware views or windows. Furthermore, the same data may thus mean different things to different entities (e.g., the hardware and the software-based processor).

The top row of the FIG. 19B instance node format 1028 thus shows an extended "ext" header used in one example non-limiting embodiment. In the case of hardware-accelerated linear motion transforms, the instance node block includes the transform at either end of the motion range. For a motion instance node shown in FIG. 19B, two transforms are used—one for the beginning of the time interval ("begin.inv . . . :) and one for the end of the time interval ("end.inv . . . "). In the example shown, the transforms are specified as inverse transforms that are inverted in order to perform the desired transform. Such an implementation may be used if the motion transform is being performed by the hardware. The hardware will linearly interpolate between the transforms, i.e., between components of the matrix at the timestamp, invert that linearly interpolated matrix, and then apply the inverted interpolated matrix to the ray. In some hardware embodiments, such interpolation tasks may be returned to the SM for processing in order to save hardware area/complexity. In other example hardware designs, the interpolation between matrices can be supported by hardware based calculators.

The example format shown in FIG. 19C includes a combination of the static instance node specification and the motion instance node specification. This "64 B Static Instance Node+128 B Motion Extension" example can be used to facilitate switching between motion on/off for all geometry/rays. With that layout, the static transform is inlined and so a clearing of the force-return-to-SM bit in all instance node leaf complets in the TLAS allows the TTU to process the instance node as a static transform instead of returning to the SM for the instance motion transform. If only instance nodes >64 B need the force-return-to-SM, then reverting that change is simply another walk of the TLAS leaf complets, flipping the force-return-to-SM bit to 1 for all instance nodes with size >1. This avoids needing a separate BVH with static transforms or for a separate build to create them. A cost however is the additional space used during regular motion transform queries.

In the FIGS. 19D, 19E examples shown, the time beginning, and time end values can be encoded in the instance node and used to translate between different time intervals in the top (TLAS) and bottom (BLAS) levels of the application data structure. This provides flexibility for the different motion time intervals between the instance node subtrees. For example, a TLAS subtree can provide an overall time interval for all of its subtrees for purposes of ray-bounding volume intersection testing, whereas different BLAS motion subtrees can be defined for different respective subinterval time ranges.

In the example described above, the complet and triangle blocks represent the position of the triangle at time 0 and time 1 to represent the position of the triangle at the beginning and the end of the frame time interval. For the next frame, the acceleration data structure needs to be updated because the triangle continues to move. In other words, the updated BVH will now specify two new time periods 0 and 1 corresponding to the next successive frame time interval. However, it will be noticed that the end of the current time frame (time 1) is the beginning of the next successive frame time interval (time 0). As an efficiency, one example non-limiting implementation includes an additional bit per triangle and/or complet that permits the data representation to swap the significance of the two time interval specifications as representing the beginning and end of the time interval or the end and beginning of the time interval, respectively. This increases the efficiency of updating the acceleration data structure by simply specifying a swap so that the previous frame's ending geometric position information is now the beginning of the next frame's geometric position, meaning that the data structure update only needs to write the new information and reuse the previous information. This allows the BVH update structure in some implementations to update just one of the two sets of vertices specifying the beginning and end positions of the moving geometry. Such hardware feature will thus allow the hardware to interpret the two endpoints of the acceleration data structure complet and triangle format in an alternating fashion from one frame to the next to avoid the need to rewrite the entire complet and triangle blocks for each frame.

Figure 20:
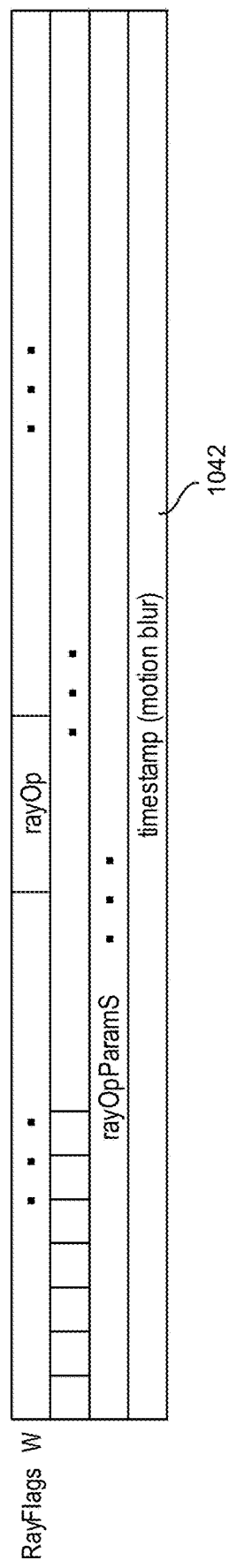
FIG. 20 is a schematic illustration of an example ray instruction storage format.

Example Non-Limiting Query Setup:

In a non-limiting embodiment, the Ray Flags are extended to include a timestamp. See FIG. 20, which shows how in one example non-limiting embodiment the timestamp for motion blur is passed with the ray instruction 1042 to the hardware. Since different time stamps may be passed in for the top level TLAS and bottom level BLAS of the acceleration data structure, the timestamp value associated with the ray is relevant to the object representation in the acceleration data structure. (See FIG. 21)

In an embodiment, the Ray Flags2 is also extended to include a timestamp. RayOrigin2 and RayDirection2 are also now valid to be set by TTU STs for an instanced ray traversal (ray type 7). Previously, these were all set indirectly by the output of a transform executed in RTT. In an embodiment, they will still be set by a static transform executed in RTT unless that transform indicates otherwise.

Example Non-Limiting Instance Node Stack Entries:

FIG. 22 shows an example implementation of a short stack to define what operation is to be performed next. In the example shown, the instance node values have been modified to specify whether the bottom ray has been transformed and a transform should not update the bottom ray origin and direction. This addition is used to accommodate the situation where the transform itself is performed on the software-based cooperating processor, whereas the mechanics of managing the entire operation to determine intersection remains accelerated by the hardware. These values thus allow transition from the bottom level (BLAS) to the top level (TLAS) of the acceleration data structure inside the hardware once the intersection operation is performed without bothering the cooperating processor. This reduces the number of round trips back to the cooperating processor by one, which increases efficiency. Thus, in the example implementation, the top to bottom operation may call for intervention from the cooperating processor to perform a transform whereas the return from bottom to top (which does not need a transform) may performed entirely by the hardware.

In one embodiment, when a bottom ray is initialized directly by the software-based processor, the instance node stack entry should have the 'b=bottom-ray transformed' bit set. It is up to the software-based processor to set this bit before passing the stack restore into the hardware. That is, in one example embodiment the hardware only reads this bit and does not set it. This bit indicates that the bottom ray's origin, direction, and timestamp have already been initialized and that the transform should not overwrite those fields.

In one embodiment, when an instance node is returned to the software-based processor and that node is used to do a bottom-ray initialization, it is the responsibility of the software-based processor in some example non-limiting embodiments to modify the instance node stack entry before restoring to the hardware process. When returned, the's=return to processor' bit is set and the 'b=bottom-ray transformed' bit is clear. When restoring, the opposite should be true with's' cleared and 'b' set. The transform will then be processed in the hardware but with the bottom ray's origin, direction, and timestamp not overwritten.

Hardware Acceleration Additions

Briefly, motion blur in some embodiments uses a per ray timestamp to locate geometry within a time interval for that particular ray. The timestamp in some embodiments is a full-precision (e.g., 32-bit floating point) value. In some embodiments, the timestamp is specified via ray flags, and stored in a Ray Management Unit (RMU) 730. The timestamp is passed to either the Ray Complet Test unit (RCT) 710 or Ray Triangle Test unit (RTT) 720 alongside the legacy ray data when those datapaths are being used. See FIG. 11 for the sub-unit layout of the TTU 138 with additions for hardware support of real time motion blur. Each addition is described in more detail below.

Figure 11:
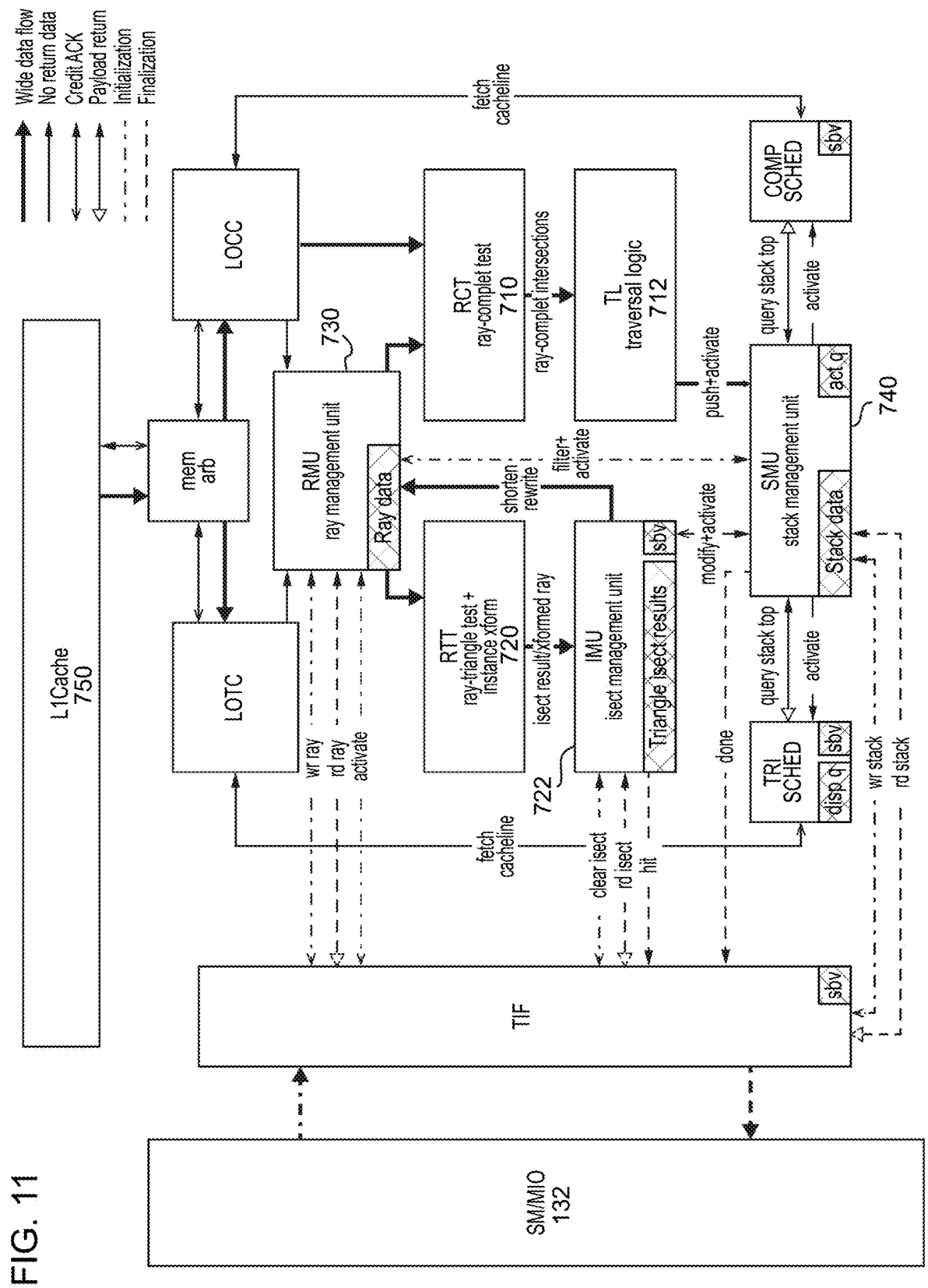
FIG. 11 shows the example FIG. 9 TTU architecture with additions for temporal interpolation/motion blur support.

Example Non-Limiting Ray Management Unit (RMU) 730 Functional Contribution:

FIG. 11 shows that in one example non-limiting embodiment, the Ray Management Unit (RMU) 730 stores the new ray timestamp. It supplies this timestamp to both RCT 710 and RTT 720 for all operations. To simplify checking in both RCT 710 and RTT 720, RMU 730 in one embodiment will detect timestamps outside of the range on initial Ray Flags write and instead store negative 0.0 for those timestamp outside of the range instead. All subsequent checks need only check the sign bit of the timestamp to determine a pre-intersection forced miss or not. RMU 730 explicitly supports writing the bottom ray fields (see above). On a transform update with bottom-ray initialized, RMU 730 will not write the bottom ray origin, ray direction, and timestamp, but will still write all other fields as usual.

Example Non-Limiting Ray Complet Test (RCT) 710 Functional Contribution:

As described above, the complet format will specify motion blur enabled or not. Motion blur can be combined with Multi-box. In one embodiment, motion complets always pair adjacent children (i.e., 0/1, 2/3, 4/5, 6/7, 8/9, A/B). Multi-box applies after that and to the original lanes such that, e.g., MotionBlur+4Box Multi-box has 0/1 and 2/3 as motion blurred multi-box pairs. Because Motion complets are already paired, only multiples of 2 greater than 2 make sense for multi-box boxes/child. For that reason, a complet that is MotionBlur+Multi-box with a multiBoxCount of 0 or 1 (i.e., 2 or 3 boxes/child) is treated as a complet format error.

At the top of the RCT 710 pipeline, linear interpolation between the two bounding boxes is done prior to any original tests in one embodiment. In this manner, the remainder of RCT 710 is untouched and is used as if only the even children were originally populated. E.g., child0 and child1 above create a linearly interpolated child that for the purposes of the rest of RCT 710 is treated as child0 while child1 becomes invalid (i.e., zlo=0xff, zhi=0x00, ylo=yhi=xlo=xhi=0x00). See FIG. 4, 4A. This math uses less than FP32 precision simply because of the compressed storage. It would be possible to use full-precision. For the actual math in pseudo-code, see FIG. 24 example of pseudo-code used to perform the interpolation within the hardware. Such pseudocode is implemented, in one example embodiment, by appropriate logic and computation circuits, such as multipliers, adders and the like. As mentioned above, different kinds of interpolation can be accommodated with corresponding complexity of the hardware.

In one embodiment, no check is made for an inverted box prior to the interpolation. If both children are inverted, the resulting interpolated box will still be inverted. If only one child is inverted the resulting interpolated box may or may not be inverted. Inverted boxes cannot be hit. But actual validity of the child is based solely on the even child.

If the timestamp is negative (i.e., outside the 0.0 to 1.0 motion range as enforced by RMU), the interpolation is skipped and none of the boxes in the complet will be hit.

In one embodiment as discussed above, motion transforms are not accelerated by the TTU. If a motion transform is intersected in RCT 710, the options are to: (1) return to the SM, (2) cull, or (3) return as a Node Ref. In one embodiment, no separate per-ray mode bits are introduced for this. Instead, the ray relies on the existing instance node mode bits (in_f and in_p). However, the new "force-return-to-sm" bit is added for each instance node in the complet. When set for that child an in_f or in_p setting of "process in the TTU" will be interpreted as "return to the SM". This mechanism is not limited to motion complets and can be used with traditional static complets as well.

Some Additional Points on the Force-Return-to-Sm Bit:
Ray Ops can still be used to cull, return as node-ref, or even return-to-sm. It is only the process-in-ttu which is forced to return-to-sm.
In one embodiment, there is no programmable override. If a transform is marked as return-to-sm, it will not be processed in the TTU by any ray.
We are repurposing a bit in a field already used, but not used in practice. I.e., this is already sent down RCT/TL so no addition to that pipeline overhead.
Motion transforms need more information than static transforms. They cannot use the same instance node formats specified. But, when mixing static and motion transforms in the same complet, the motion transform should have an interleaved instance node that fits among the other static transform instance nodes so that it can be returned per the mechanics of complet leaf pointers. The size field does support multi-size instance nodes and so motion instance nodes could be interleaved with static instance nodes as well.

As a programming note, in all cases, the bounding boxes at either end of the time interval can be sized to ensure the interpolated AABB will conservatively enclose the moving geometry at all points in the interval. This is especially helpful when there is non-linear motion such as FIG. 23, which shows a bounding volume following a curved path from the beginning to the end of a time interval.

Example Non-Limiting Ray Triangle Test (RTT) 720 Functional Contribution:

When a triangle block is specified as motion blur in one embodiment, the vertices for the specified primitive are linearly interpolated. Unlike RCT 710, the RTT 720 interpolation uses full (e.g., FP32) precision to interpolate the vertices since in one embodiment the ray-geometry intersection test is exact. The linear interpolation is as described above in connection with FIGS. 5 and 5A. The V[0,1,2].0 and V[0,1,2].1 in that diagram are the v[0,1,2].start and v[0,1,2].end respectively in the motion blur triangle block.

If the timestamp is negative (i.e., outside the 0.0 to 1.0 motion range as enforced by RMU 730), the interpolation is skipped, and the triangle is not intersected.

In one embodiment, no checks or pre-conditions are made on the pairing of the vertices. The FIG. 5, 5A example diagram shows a very linear motion, but since the vertices are interpolated independently, it is possible for the interpolated triangle to rotate, become zero-area, or flip direction.

In one embodiment, the RTT 720 implementation uses a two-pass approach where the first pass linearly interpolates between vertices or center/radius, and then a second pass performs a typical intersection test against the interpolated primitive. A single pass could be done as well for a higher area cost with more math units.

In one embodiment, the RTT 720 processes vertices in parallel. For "watertightness" reasons, all vertices are interpolated in the same manner independently of the lane used. If not, then adjacent triangles that use the same vertices but have those vertices go down different vertex processing lanes might see those vertices at different interpolated points for the same timestamp, thereby introducing holes in the mesh and creating associated artifacts.

In one embodiment, the RTT 720 unit is also responsible for processing instance transforms. When using motion transforms interpolated on the SM132, the bottom-ray initialized bit is used to prevent the TTU 138 from overwriting the transform already done. In one embodiment, when processing an instance transform with the bottom-ray initialized bit set, the mathematical output of the transform is not used and is instead set to 0. Whether set or not, the bottom-ray initialized bit is sent along with the transformed ray so that it eventually makes its way to the RMU 730 so that the RMU can act as described above.

Instance transforms for motion are not handled directly in hardware in one example non-limiting version of the architecture. Other implementations however may directly accelerate motion transforms. A linear motion instance transform involves a linear interpolation of the components of the transform matrix at the key points, an inversion of that interpolated matrix, and then the application of that transform matrix to the ray's origin and direction.

When motion transforms need to be returned to the cooperating software-based processor, example non-limiting embodiments add supporting measures to make that more performant. For example, such supporting measures may include a per instance-node-child force-return-to-processor bit, and an ability to write an already transformed bottom ray into the hardware.

When processing an instance node with format of 1, the lower bits of the rootCompletPtr can still be treated as 0, just as they were previously.

In one embodiment, triangle fetch is supported for motion triangles. The timestamp specified via the RayFlags write will be used if present. In one embodiment, the following behavior holds:

- If timestamp ==0.0 f or if no timestamp is specified, then the vertices for the beginning triangle are returned without interpolation.
- If timestamp ==1.0 f, then the vertices for the end triangle are returned without interpolation.
- If timestamp >0.0 f and <1.0 f, then the interpolated vertices are returned.
- If index is >num motion triangles or the timestamp is <0.0 f, >1.0 f, or −0.0 f, then the return will be all zeros for vertices, ID, and alpha, just like an invalid index for non-motion/static triangles. No error is reported in this case.
- If the fetch targets a static triangle block, then the timestamp will be ignored completely, and the fetch will be treated as a normal static triangle fetch. Triangle fetch thus allows a triangle to be pulled out of the compressed triangle blocks used by the hardware for traversal. This is support for motion triangles by supplying a timestamp along with the fetch query that will allow for interpolation or key selection. A timestamp is not required, and if absent, the vertices for the triangle at the beginning of the range will be returned.

Intersection Management Unit (IMU) 722 Functional Contribution:

In one embodiment, IMU 722 passes along the bottom-ray initialized bit to the RMU 730 so that the RMU can write the correct fields.

Stack Management Unit (SMU) 740 Functional Contribution:

In one embodiment, when a bottom ray is initialized directly by SM 132, the instance node stack entry should have the 'b=bottom-ray initialized' bit set. As described, in one embodiment it is up to SM 132 to set this bit before passing the stack restore into the TTU 138. SMU 740 only reads this bit and does not set it. In one embodiment, this bit is sent along in the meta data for the transform request through TriSched and L0TC where it will eventually be used by RTT 720, IMU 722, and RMU 730 as described above.

Example Explicit Motion Ranges:

In one embodiment, implicit inclusive range [0.0,1.0] is an implementation simplification. Per-complet motion ranges are also an option achievable by storing a start and end timestamp in the complet and triangle blocks. The operations then translate the given timestamp into that arbitrary motion range instead of the [0.0,1.0]. This takes just a little more math and associated hardware complexity and real estate.

Example Instancing Pipeline Implementation by TTU 138 and SM 132

Figure 25A:
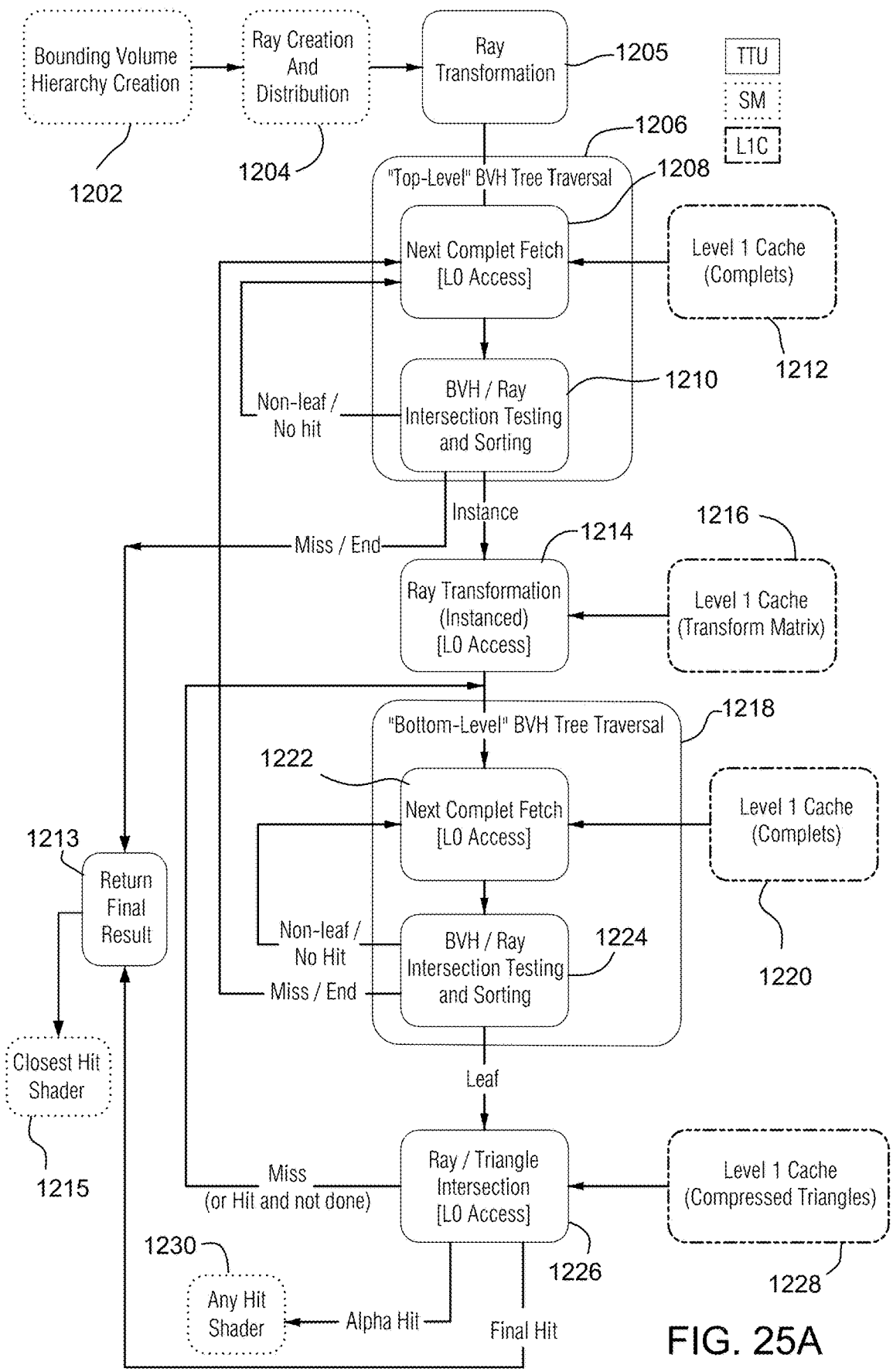
FIGS. 25A and 25B illustrate more detailed ray tracing pipelines.

The following describes how TTU 138 in example embodiments performs instancing and associated transforms:

The FIG. 25A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 25A is essentially software-defined (which in example embodiments means it is determined by the SMs 132) but makes extensive use of hardware acceleration by TTU 138. Key components include the SM 132 (and the rest of the compute pipeline), the TTU 138 (which serves as a coprocessor to SM), and the L1 cache and downstream memory system, from which the TTU fetches BVH and triangle data.

The pipeline shown in FIG. 25A shows that bounding volume hierarchy creation 1002 can be performed ahead of time by a development system. It also shows that ray creation and distribution 1004 are performed or controlled by the SM 132 or other software in the example embodiment, as shading (which can include lighting and texturing). The example pipeline includes a "top level" BVH tree traversal 1006, ray transformation 1014, "bottom level" BVH tree traversal 1018, and a ray/triangle (or other primitive) intersection 1026 that are each performed by the TTU 138. These do not have to be performed in the order shown, as handshaking between the TTU 138 and the SM 132 determines what the TTU 138 does and in what order.

The SM 132 presents one or more rays to the TTU 138 at a time. Each ray the SM 132 presents to the TTU 138 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 138 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 138 will process the query when the query intersects the bounding volume of a specific type or intersects a primitive of a specific primitive type. The mode flags the SM 132 provides to the TTU 138 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 138 to control various aspects of traversal behavior, back-face culling, and handling of the various child node types, subject to a pass/fail status of an optional RayOp test. RayOp tests add flexibility to the capabilities of the TTU 138, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 25A, the TTU 138 performs a top level tree traversal 1006 and a bottom level tree traversal 1018. In the example embodiment, the two level traversal of the BVH enables fast ray tracing responses to dynamic scene changes.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1006 by TTU 138 receives complets from the L1 cache 1012, and provides an instance to the ray transformation 1014 for transformation, or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet.

Figure 25B:
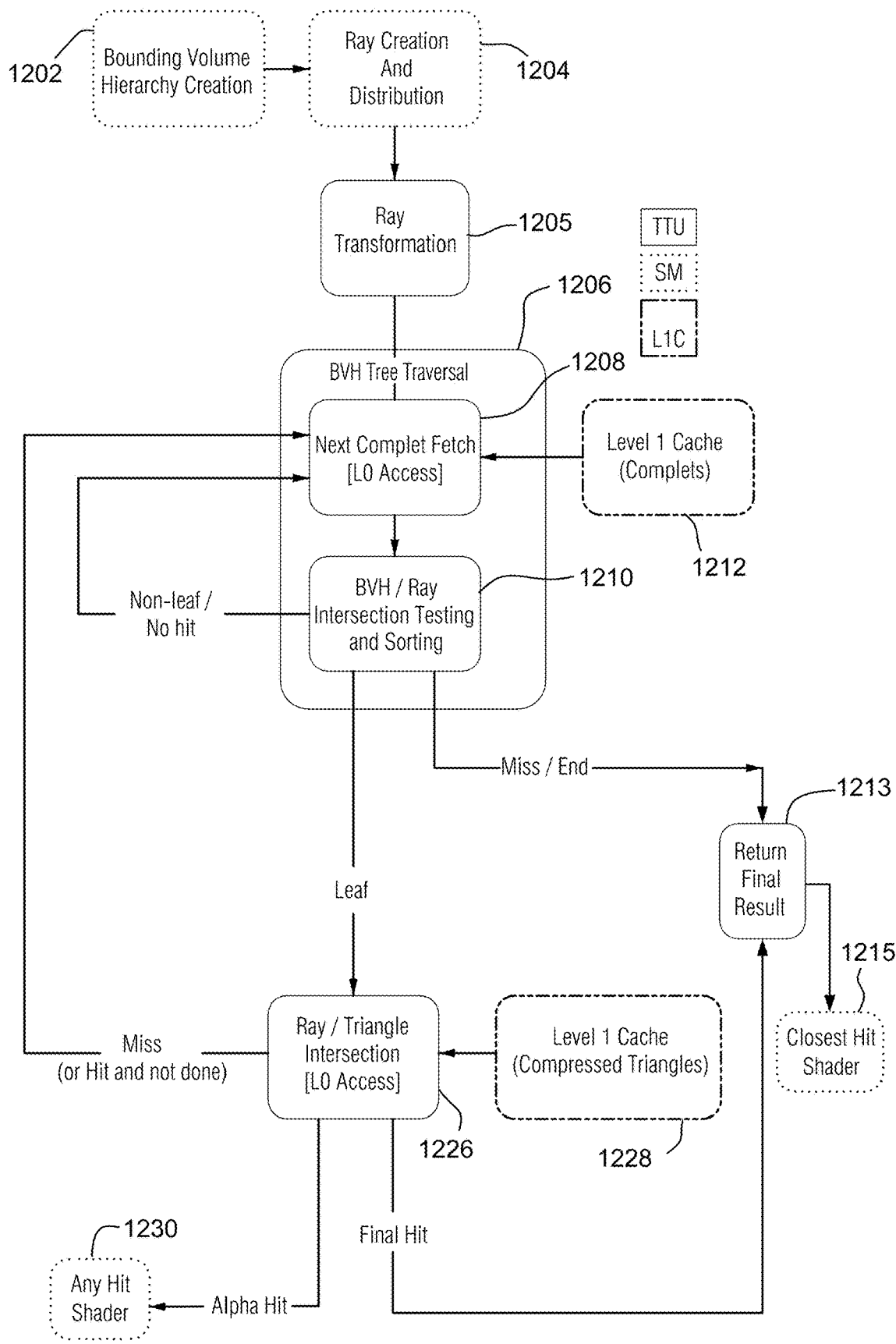

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 138, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 138 shown in FIG. 25B, the TTU does not execute a "bottom" level tree traversal 1018 and noninstanced tree BVH traversals are performed by blocks 1008, 1010 e.g., using only one stack. The TTU 138 can switch between the FIG. 25A instanced operations and the FIG. 25B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018.

Example Bottom Level Tree Traversal

In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

The leaf outputs of the bottom level tree traversal 1018 are provided to the ray/triangle intersection 1026 (which has L0 cache access as well as ability to retrieve triangles via the L1 cache 1028). The L0 complet and triangle caches may be small read-only caches internal to the TTU 138. The ray/triangle intersection 1026 may also receive leaf outputs from the top level tree traversal 1006 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 of necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there are opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 6).

Figure 26:
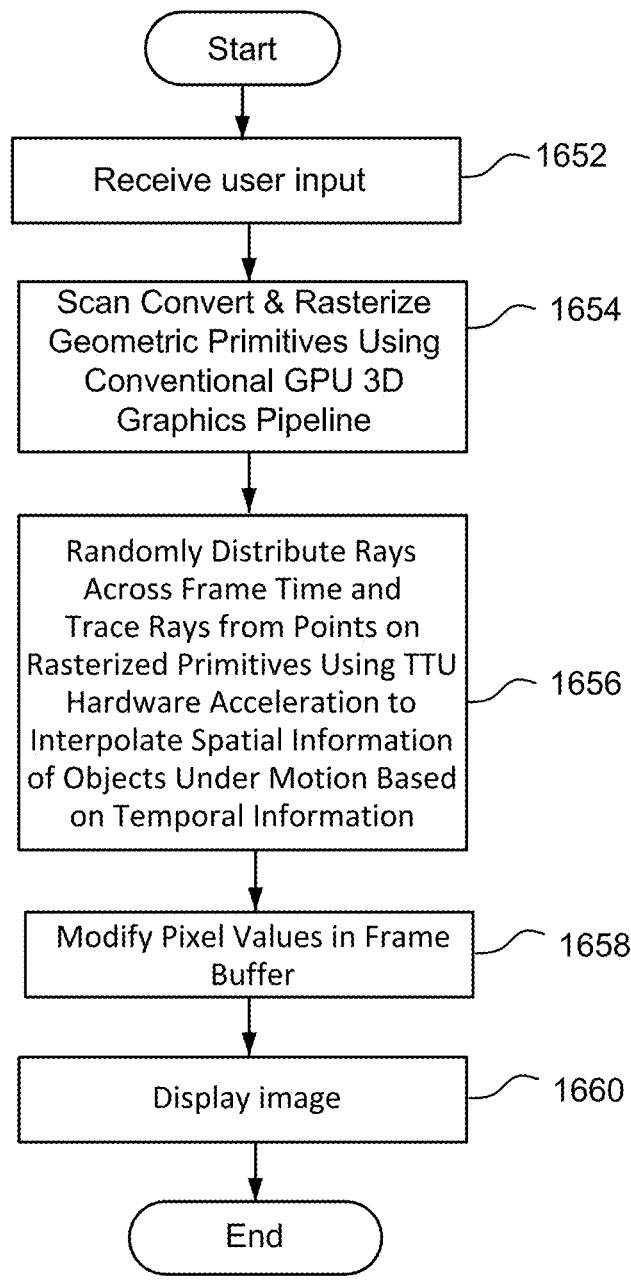
FIG. 26 is a flowchart of an example process to generate an image with hardware-accelerated motion blur caused by moving/deforming geometry.

Meanwhile, however, the technology herein provides advantages when used to produce images for virtual reality, augmented reality, mixed reality, video games, motion and still picture generation, and other visualization applications. FIG. 26 illustrates an example flowchart for processing primitives to provide image pixel values of an image, in accordance with an embodiment. As FIG. 26 shows, an image of a 3D model may be generated in response to receiving a user input (Step 1652). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1656, one or more rays may be traced from one or more points on the rasterized primitives using TTU hardware acceleration. The rays may be traced in accordance with the one or more ray-tracing capabilities disclosed in this application, for example by randomly distributing rays across the frame time & tracing rays from points on rasterized primitives using TTU hardware acceleration to interpolate spatial information of objects under motion based on temporal information to accomplish motion blur (block 1656). Such ray tracing can be combined with other ray tracing effects such as shadowing, reflection, etc. Based on the results of the ray tracing, the pixel values stored in the buffer may be modified (Step 1658). Modifying the pixel values may in some applications for example improve the image quality by, for example, applying more realistic reflections and/or shadows. An image is displayed (Step 1660) using the modified pixel values stored in the buffer.

In one example, scan conversion and rasterization of geometric primitives may be implemented using the processing system described above, and ray tracing may be implemented by the SM's 132 using the TTU architecture described in relation to FIG. 9, to add further visualization features (e.g., specular reflection, shadows, etc.). FIG. 26 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 138 in some embodiments is stateless, meaning that no architectural state is maintained in the TTU between queries. At the same time, it is often useful for software running on the SM 1840 to request continuation of a previous query, which implies that relevant state should be written to registers by the TTU 138 and then passed back to the TTU in registers (often in-place) to continue. This state may take the form of a traversal stack that tracks progress in the traversal of the BVH.

A small number of stack initializers may also be provided for beginning a new query of a given type, for example:
Traversal starting from a complet
Intersection of a ray with a range of triangles
Intersection of a ray with a range of triangles, followed by traversal starting from a complet
Vertex fetch from a triangle buffer for a given triangle
Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 138 can return to the SM. Example node types are:
A child complet (i.e., an internal node)
By default, the TTU 138 continues traversal by descending into child complets.
A triangle range, corresponding to a contiguous set of triangles within a triangle buffer
(1) By default, triangle ranges encountered by a ray are handled natively by the TTU 138 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
(2) By default, intersected triangles with the alpha bit set are returned to SM 1840 even if traversal has not completed. The returned traversal stack contains the state required to continue traversal if software determines that the triangle was in fact transparent.
(3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.
An item range, consisting of an index (derived from a user-provided "item range base" stored in the complet) and a count of items.
By default, item ranges are returned to SM 1840 as an "ItemRange" hit type, consisting of for example an index, a count, and the t-value of the intersection with the leaf bounding box.
An instance node.
The TTU 138 in some embodiments can handle one level of instancing natively by transforming the ray into the coordinate system of the instance BVH. Additional levels of instancing (or every other level of instancing, depending on strategy) may be handled in software (or in other embodiments, the TTU 138 hardware can handle two, three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 138.

Additional mode flags may be provided for control handling of alpha triangles.

While the examples above relate to and/or describe interpolation between positions of vertex sets and/or bounding volumes, suitable techniques other than interpolation may be employed to determine intermediate positions between starting and ending positions of geometry and/or bounding volumes. Similarly, whereas example embodiments have been described using both bounding volume interpolation techniques such as in FIG. 4 and geometry vertex interpolation techniques such as in FIG. 5, other embodiments could interpolate bounding volume positions without interpolating geometry vertices, or interpolate geometry vertices without interpolating bounding volumes. As an example, it may be desirable in some implementations to use different bounding volume intersection tests such as those based on swept volumes, and use interpolation only for primitive intersection testing. Similarly, it may be desirable in some embodiments to use interpolation of bounding volumes for bounding volume intersection testing without interpolating underlying primitives.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims

The invention claimed is:

1. A bounding volume hierarchy builder system for constructing acceleration data structures to be consumed by ray tracers of the type including memory access circuitry configured to retrieve at least portions of the acceleration data structure including (a) vertex sets defining geometry, and (b) data defining bounding volumes bounding said geometry; ray management hardware configured to provide spatial and temporal data associated with rays; and ray-geometry intersection testing hardware operatively coupled to the memory access circuitry and the ray management, the ray-geometry intersection testing hardware configured to determine whether rays intersect geometry and to interpolate a spatial position of geometry based on temporal data associated with a ray, the builder system including at least one processor to perform operations comprising:
detection to determine whether geometry is under motion; and
a motion treelet constructing defining motion treelets for subsequent interpolation by hardware ray tracing interpolation circuitry, including defining for treelet nodes, first positional information defining position at a first time and second positional information defining position at a second time different from the first time.

2. The bounding volume hierarchy builder system of claim 1 wherein the motion treelet constructing is to define, within the motion treelets, a return to processor indicator that selects between a software-based processor and the hardware ray tracing interpolation circuitry for performing the interpolation.

3. The bounding volume hierarchy builder system of claim 1 wherein the motion treelet constructing is to define motion treelets that are formatted differently depending on whether the detection determines the geometry is under motion.

4. The bounding volume hierarchy builder system of claim 3 wherein the detection is to determine whether the geometry is deforming over time.

5. The bounding volume hierarchy builder system of claim 1 wherein the motion treelet construction is to construct bounding volumes for moving geometry that rounds positional results conservatively to account for limited resolution of interpolation by the ray tracing interpolation hardware circuitry.

6. The bounding volume hierarchy builder system of claim 1 wherein the motion treelet constructing is to construct motion instance nodes including both static and motion information for the same instance primitive.

7. The bounding volume hierarchy builder system of claim 1 wherein the motion treelet constructing is to construct motion instance nodes including motion range change data.

8. A ray tracing system including:
memory access circuitry to retrieve from non-transitory storage, at least portions of an acceleration data structure including (a) vertex sets defining geometry, and (b) data defining bounding volumes bounding said geometry;
ray management circuitry to provide spatial and temporal data associated with rays; and
ray-geometry intersection tester circuits operatively coupled to the memory access circuitry and the ray management circuitry, the ray-geometry intersection tester circuits to determine whether rays intersect geometry and to interpolate a spatial position of geometry based on temporal data associated with a ray,
the non-transitory storage storing ray data for instanced ray traversal against instanced geometry,
the ray data comprising:
first and second ray position data each including ray origin, ray direction and ray range; and
first and second ray time stamps configured for use as input to hardware interpolation circuitry,
wherein the second ray position data is configured to be set by hardware-based instance transforms responsive to said time stamps.

9. A system for constructing acceleration data structures to be consumed by ray tracers of the type including memory access circuitry to retrieve at least portions of the acceleration data structure including (a) vertex sets defining geometry, and (b) data defining bounding volumes bounding said geometry; ray management circuitry configured to provide spatial and temporal data associated with rays; and ray-geometry intersection tester circuits operatively coupled to the memory access circuitry and the ray management circuits, the ray-geometry intersection tester circuits configured to determine whether rays intersect geometry and to interpolate a spatial position of geometry based on temporal data associated with a ray, non-transitory storage connected to hardware-based ray tracing circuitry, the non-transitory storage storing instance node stack entries for access by the hardware-based ray tracing circuitry, the stack entries comprising:

a bottom ray transformed write protection value configured to be set by a software-based processor and read by the hardware-based ray tracing circuitry, the bottom ray transformed value signaling that the hardware-based ray tracing circuitry should not overwrite ray origin/direction/timestamp information specified by the software-based processor.

10. A ray tracing method comprising:

encoding a ray with timing information specifying when a ray photon passes through a scene;

encoding acceleration data structure nodes representing moving geometry with spatial information specifying plural positions of the moving geometry at corresponding different plural times; and using a ray tracer to calculate an interpolation between the specified plural positions of the moving geometry at the timing of the ray, and to compare-spatial information of the ray with calculated interpolated positions of the moving geometry at timing of the ray to determine where the moving geometry exists in space at an instant of the ray photon and whether the ray intersects the moving geometry at a the timing of the ray.

11. The ray tracing method of claim 10 further comprising comparing the ray's spatial information with the interpolated positions of the moving geometry at the timing of the ray to determine whether the ray intersects the moving geometry at the instant of the ray photon.

12. The ray tracing method of claim 10 wherein the acceleration data structure comprises motion complets encoded with a beginning time and an end time at which the represented geometry exists in a scene, and with beginning and ending spatial positions of each vertex of the geometry the motion complet represents, and using the ray tracer comprises interpolating between the beginning and ending spatial positions to calculate the spatial positions of the geometry at the instant of the ray.

13. The ray tracing method of claim 10 wherein using includes the ray tracer performing linear interpolation to determine position of the moving geometry at the instant of the ray.

14. The ray tracing method of claim 10 wherein using includes the tray-ray tracer maintaining procedural control over an intersection testing process.

15. The ray tracing method of claim 10 wherein using includes calculating low and high points of an axis aligned bounding volume at a timestamp value specified by the ray.

16. The ray tracing method of claim 10 wherein using includes performing linear interpolation using circuitry comprising a hardware adder circuit, a hardware multiplier circuit, a hardware shift register and rounder circuit, and a hardware adder circuit.

17. The ray tracing method of claim 10 wherein using includes operating hardware circuits to interpolate in three dimensions.

18. The ray tracing method of claim 10 wherein using comprises:

first calculating, using a lower precision, a spatial position of a bounding volume at an instant in time represented by the ray, and then performing an intersection test at a different, higher precision than the lower precision, to determine whether the ray intersects the bounding volume at the instant in time represented by the ray.

19. The ray tracing method of claim 18 wherein the acceleration data structure represents the bounding volume at the lower precision, and the ray tracer converts the bounding volume location to the higher precision in order to determine whether the ray intersects the bounding volume at the instant in time represented by the ray.

\* \* \* \* \*